(12) United States Patent
Chen et al.

(10) Patent No.: US 10,492,205 B2
(45) Date of Patent: Nov. 26, 2019

(54) UPLINK INTERFERENCE PROCESSING METHOD, DEVICE AND SYSTEM

(71) Applicant: Huawei Technologies Co., Ltd., Shenzhen (CN)

(72) Inventors: Tuo Chen, Shanghai (CN); Qunfang Lou, Shanghai (CN); Li Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 203 days.

(21) Appl. No.: 15/493,689

(22) Filed: Apr. 21, 2017

(65) Prior Publication Data

US 2017/0223714 A1    Aug. 3, 2017

Related U.S. Application Data

(63) Continuation of application No. PCT/CN2015/078588, filed on May 8, 2015.

(30) Foreign Application Priority Data

Oct. 23, 2014 (CN) .......................... 2014 1 0572522

(51) Int. Cl.
*H04W 72/08* (2009.01)
*H04W 28/04* (2009.01)

(52) U.S. Cl.
CPC ......... *H04W 72/082* (2013.01); *H04W 28/04* (2013.01)

(58) Field of Classification Search
CPC ... H04L 12/868; H04L 41/0806; H04W 24/06

USPC .................................................. 370/252-469
See application file for complete search history.

(56) References Cited

U.S. PATENT DOCUMENTS

| 2011/0268007 | A1 | 11/2011 | Barany et al. |
| 2012/0026940 | A1* | 2/2012 | Barbieri ............... H04L 5/0032 370/328 |
| 2012/0093093 | A1 | 4/2012 | Frenger et al. |
| 2012/0127941 | A1* | 5/2012 | Li ......................... H04W 88/08 370/329 |
| 2014/0119276 | A1 | 5/2014 | Boudreau et al. |

(Continued)

FOREIGN PATENT DOCUMENTS

| CN | 102801490 A | 11/2012 |
| CN | 103931258 A | 7/2014 |
| CN | 103945556 A | 7/2014 |

*Primary Examiner* — Iqbal Zaidi
(74) *Attorney, Agent, or Firm* — Slater Matsil, LLP

(57) ABSTRACT

Embodiments of the present invention provide an uplink interference processing method, device and system. The method includes: receiving, by a first network device, information about second UE that is transmitted by a second network device; reconstructing uplink air interface data of the second UE according to the information about the second UE when uplink air interface data of the first UE is parsed incorrectly after first uplink air interface data is received, and obtaining the reconstructed uplink air interface data of the second UE; clearing the reconstructed uplink air interface data of the second UE from the first uplink air interface data to obtain second uplink air interface data; and parsing the second uplink air interface data according to information about the first UE, and obtaining a parsing result of the uplink air interface data of the first UE.

15 Claims, 13 Drawing Sheets

(56) References Cited

U.S. PATENT DOCUMENTS

| | | |
|---|---|---|
| 2014/0148179 A1 | 5/2014 | Das et al. |
| 2014/0185532 A1* | 7/2014 | Rao .................... H04W 72/082 370/329 |
| 2014/0274096 A1 | 9/2014 | Stanwood et al. |

* cited by examiner

UPLINK INTERFERENCE PROCESSING METHOD, DEVICE AND SYSTEM

CROSS-REFERENCE TO RELATED APPLICATIONS

This application is a continuation of International Application No. PCT/CN2015/078588, filed on May 8, 2015, which claims priority to Chinese Patent Application No. 201410572522.9, filed on Oct. 23, 2014. The disclosures of the aforementioned applications are hereby incorporated by reference in their entireties.

TECHNICAL FIELD

Embodiments of the present invention relate to the field of communications technologies, and in particular, to an uplink interference processing method, device and system.

BACKGROUND

When user equipments (UE) access different base stations, for example, UE 0 accesses a base station 0 and UE 1 accesses a base station 1, uplink data transmitted by the UE 0 to the base station 0 causes interference to uplink data transmitted by the UE 1 to the base station 1. Therefore, an uplink coordinated multiple point interference cancellation (CoMP IC) technology needs to be used to implement interference suppression between uplink data of UEs belonging to different base stations. Uplink transmission performance of an interfered-with UE is enhanced by clearing uplink data of an interfering UE, so as to significantly increase an uplink throughput of the interfered-with UE.

In the prior art, in an example in which the UE 0 is used as the interfering UE and the UE 1 is used as the interfered-with UE, the base station 1 receives uplink data transmitted by both the UE 0 and the UE 1, and the uplink data of the UE 0 causes interference to the uplink data of the UE 1. First, the base station 0 transmits information about the UE 0 to the base station 1, and then the base station 1 receives uplink air interface data of the UE 1 and uplink air interface data of the UE 0. The UE 1 parses the uplink air interface data of the UE 1. When the uplink air interface data is parsed incorrectly, the UE 1 transmits, to the base station 0, information about a channel from the UE 0 to the base station 1. According to uplink data of the UE 0 and the information about the channel from the UE 0 to the base station 1, the base station 0 reconstructs uplink air interface data of the UE 0, and transmits the uplink air interface data to the base station 1. The base station 1 may clear the uplink air interface data of the UE 0, and then may correctly parse the uplink air interface data of the UE 1, so as to improve uplink transmission performance of the UE 1.

However, in the foregoing solution, interaction between the base station 0 and the base station 1 needs to occur three times. When there is a constraint of bandwidth and a delay of an interaction channel between the base station 0 and the base station 1, it is difficult to implement the foregoing solution.

SUMMARY

Embodiments of the present invention provide an uplink interference processing method, device and system to improve uplink transmission performance of UE when there is a constraint of bandwidth and a delay of an interaction channel between network devices.

According to a first aspect, an embodiment of the present invention provides a network device that serves as a first network device. The network device includes a receiving unit, configured to receive information about second UE that is transmitted by a second network device, where the information about the second UE includes scheduling information of the second UE and configuration information of a serving cell of the second UE, and the second UE accesses the second network device; and receive first uplink air interface data, where the first uplink air interface data includes uplink air interface data of first UE and uplink air interface data of the second UE, and the first UE accesses the first network device. The network device also includes a reconstruction unit, configured to: when the uplink air interface data of the first UE is parsed unsuccessfully, reconstruct uplink air interface data of the second UE according to the information about the second UE that is received by the receiving unit, and obtain the reconstructed uplink air interface data of the second UE. The network device also includes a processing unit, configured to: clear, from the first uplink air interface data, the reconstructed uplink air interface data of the second UE that is obtained by the reconstruction unit, and obtain second uplink air interface data. The network device also includes a parsing unit, configured to: parse, according to information about the first UE, the second uplink air interface data obtained by the processing unit, and obtain a parsing result of the uplink air interface data of the first UE, where the information about the first UE includes scheduling information of the first UE and configuration information of a serving cell of the first UE.

In a first possible implementation manner of the first aspect, the reconstruction unit is configured to: reconstruct the uplink air interface data of the second UE according to the information about the second UE, information about a channel from the second UE to the first network device, and a parsing result of the uplink air interface data of the second UE, and obtain the reconstructed uplink air interface data of the second UE.

With reference to the first possible implementation manner of the first aspect, in a second possible implementation manner of the first aspect, the parsing unit is further configured to: before the reconstruction unit reconstructs the uplink air interface data of the second UE according to the information about the second UE and obtains the reconstructed uplink air interface data of the second UE, parse the first uplink air interface data according to the information about the second UE, and obtain the parsing result of the uplink air interface data of the second UE.

With reference to the first possible implementation manner of the first aspect, in a third possible implementation manner of the first aspect, the receiving unit is further configured to: before the reconstruction unit reconstructs the uplink air interface data of the second UE according to the information about the second UE and obtains the reconstructed uplink air interface data of the second UE, receive the parsing result that is of the uplink air interface data of the second UE and transmitted by the second network device.

With reference to the third possible implementation manner of the first aspect, in a fourth possible implementation manner of the first aspect, the network device further includes: a first transmitting unit; where the processing unit is further configured to stop processing a current hybrid automatic repeat request (HARQ for short) process when a time interval is greater than a preset time period, where the time interval is from a start of receiving the first uplink air interface data by the receiving unit to a start of receiving the parsing result of the uplink air interface data of the second UE; the first transmitting unit is configured to transmit an acknowledgement (ACK for short) message to the first UE; and that the reconstruction unit reconstructs the uplink air interface data of the second UE according to the information about the second UE and obtains the reconstructed uplink air interface data of the second UE includes: the reconstruction unit is configured to reconstruct the uplink air interface data of the second UE according to the information about the second UE when a time point of processing a next HARQ process of the current HARQ process arrives, and obtain the reconstructed uplink air interface data of the second UE.

With reference to any one of the first aspect or the first to the fourth possible implementation manners of the first aspect, in a fifth possible implementation manner of the first aspect, the network device further includes a second transmitting unit, configured to: after the parsing unit parses the second uplink air interface data according to the information about the first UE and obtains the parsing result of the uplink air interface data of the first UE, transmit retransmission information to the first UE by using a physical downlink control channel (PDCCH for short) when the parsing result of the uplink air interface data of the first UE is incorrect.

According to a second aspect, an embodiment of the present invention provides a network device that serves as a second network device. The network device includes a transmitting unit, configured to transmit information about second UE to a first network device, where the information about the second UE includes scheduling information of the second UE and configuration information of a serving cell of the second UE, and the second UE accesses the second network device. The network device also includes a receiving unit, configured to receive third uplink air interface data, where the third uplink air interface data includes uplink air interface data of the second UE. The network device also includes a parsing unit, configured to: parse, according to the information about the second UE, the third uplink air interface data received by the receiving unit, and obtain a parsing result of the uplink air interface data of the second UE.

In a first possible implementation manner of the second aspect, the transmitting unit is further configured to transmit the parsing result of the uplink air interface data of the second UE to the first network device, where the parsing result is obtained by the parsing unit.

According to a third aspect, an embodiment of the present invention provides a network device that serves as a first network device. The network device includes a transmitting unit, configured to transmit information about first UE to a second network device, where the information about the first UE includes scheduling information of the first UE and configuration information of a serving cell of the first UE, and the first UE accesses the first network device. The network device also includes a receiving unit, configured to receive fourth uplink air interface data, where the fourth uplink air interface data includes uplink air interface data of the first UE. The network device also includes a parsing unit, configured to: parse the fourth uplink air interface data according to the information about the first UE, and obtain a first parsing result of the uplink air interface data of the first UE, where the receiving unit is further configured to receive indication information and a second parsing result of the uplink air interface data of the first UE that are transmitted by the second network device, where the indication information is used to indicate whether the second parsing result is correct or incorrect, and the second parsing result is a parsing result of the uplink air interface data of the first UE and is obtained by the second network device according to the information about the first UE and air interface data received by the second network device. The network device also includes a processing unit, configured to obtain a parsing result of the uplink air interface data of the first UE according to the first parsing result obtained by the parsing unit and the indication information and the second parsing result that are received by the receiving unit.

In a first possible implementation manner of the third aspect, the processing unit is configured to use the first parsing result as the parsing result of the uplink air interface data of the first UE when the first parsing result is correct.

In a second possible implementation manner of the third aspect, the processing unit is configured to use the second parsing result as the parsing result of the uplink air interface data of the first UE when the first parsing result is incorrect and the indication information indicates that the second parsing result is correct.

In a third possible implementation manner of the third aspect, the processing unit is configured to: when the first parsing result is incorrect and the indication information indicates that the second parsing result is incorrect, combine the first parsing result and the second parsing result to obtain the parsing result of the uplink air interface data of the first UE.

With reference to the third possible implementation manner of the third aspect, in a fourth possible implementation manner of the third aspect, the transmitting unit is further configured to: after the processing unit combines the first parsing result and the second parsing result to obtain the parsing result of the uplink air interface data of the first UE, transmit retransmission information to the first UE by using a physical downlink control channel PDCCH when the parsing result of the uplink air interface data of the first UE is incorrect.

With reference to any one of the second to the fourth possible implementation manners of the third aspect, in a fifth possible implementation manner of the third aspect, the processing unit is further configured to stop processing a current HARQ process when a time interval is greater than a preset time period, where the time interval is from a start of receiving the fourth uplink air interface data by the receiving unit to a start of receiving the indication information and the second parsing result; the transmitting unit is further configured to transmit an ACK message to the first UE; and that the processing unit obtains the parsing result of the uplink air interface data of the first UE according to the first parsing result, the indication information, and the second parsing result includes: the processing unit is configured to obtain, by the first network device, the parsing result of the uplink air interface data of the first UE according to the first parsing result, the indication information, and the second parsing result when a time point of processing a next HARQ process of the current HARQ process arrives.

According to a fourth aspect, an embodiment of the present invention provides a network device that serves as a second network device. The network device includes a receiving unit, configured to receive information about first UE transmitted by a first network device, where the information about the first UE includes scheduling information of the first UE and configuration information of a serving cell of the first UE, and the first UE accesses the first network device; receive fifth uplink air interface data, where the fifth uplink air interface data includes uplink air interface data of the first UE and uplink air interface data of second UE, and the second UE accesses the second network device. The network device also includes a processing unit, configured to obtain a second parsing result of the uplink air interface data of the first UE according to the information about the first UE and the fifth uplink air interface data that are received by the receiving unit. The network device also includes a transmitting unit, configured to transmit indication information and the second parsing result to the first network device, where the indication information is used to indicate whether the second parsing result is correct or incorrect.

In a first possible implementation manner of the fourth aspect, the processing unit is configured to: parse the fifth uplink air interface data according to the information about the first UE, and obtain the second parsing result.

In a second possible implementation manner of the fourth aspect, the processing unit is configured to: parse the fifth uplink air interface data according to information about the second UE, and obtain a parsing result of the uplink air interface data of the second UE, where the information about the second UE includes scheduling information of the second UE and configuration information of a serving cell of the second UE; reconstruct uplink air interface data of the second UE according to the information about the second UE, information about a channel between the second UE and the second network device, and the parsing result of the uplink air interface data of the second UE, and obtain the reconstructed uplink air interface data of the second UE; clear the reconstructed uplink air interface data of the second UE from the fifth uplink air interface data and obtain sixth uplink air interface data; and parse the sixth uplink air interface data according to the information about the first UE, and obtain the second parsing result.

According to a fifth aspect, an embodiment of the present invention provides an uplink interference processing method. The method includes receiving, by a first network device, information about second UE that is transmitted by a second network device, where the information about the second UE includes scheduling information of the second UE and configuration information of a serving cell of the second UE, and the second UE accesses the second network device. The method also includes receiving, by the first network device, first uplink air interface data, where the first uplink air interface data includes uplink air interface data of first UE and uplink air interface data of the second UE, and the first UE accesses the first network device; when the uplink air interface data of the first UE is parsed unsuccessfully, reconstructing, by the first network device, uplink air interface data of the second UE according to the information about the second UE, and obtaining the reconstructed uplink air interface data of the second UE. The method also includes clearing, by the first network device, the reconstructed uplink air interface data of the second UE from the first uplink air interface data, and obtaining second uplink air interface data. The method also includes parsing, by the first network device, the second uplink air interface data according to information about the first UE, and obtaining a parsing result of the uplink air interface data of the first UE, where the information about the first UE includes scheduling information of the first UE and configuration information of a serving cell of the first UE.

In a first possible implementation manner of the fifth aspect, the reconstructing, by the first network device, uplink air interface data of the second UE according to the information about the second UE, and obtaining the reconstructed uplink air interface data of the second UE includes: reconstructing, by the first network device, the uplink air interface data of the second UE according to the information about the second UE, information about a channel from the second UE to the first network device, and a parsing result of the uplink air interface data of the second UE, and obtaining the reconstructed uplink air interface data of the second UE.

With reference to the first possible implementation manner of the fifth aspect, in a second possible implementation manner of the fifth aspect, before the reconstructing, by the first network device, uplink air interface data of the second UE according to the information about the second UE, and obtaining the reconstructed uplink air interface data of the second UE, the method further includes: parsing, by the first network device, the first uplink air interface data according to the information about the second UE, and obtaining the parsing result of the uplink air interface data of the second UE.

With reference to the first possible implementation manner of the fifth aspect, in a third possible implementation manner of the fifth aspect, before the reconstructing, by the first network device, uplink air interface data of the second UE according to the information about the second UE, and obtaining the reconstructed uplink air interface data of the second UE, the method further includes: receiving, by the first network device, the parsing result that is of the uplink air interface data of the second UE and transmitted by the second network device.

With reference to the third possible implementation manner of the fifth aspect, in a fourth possible implementation manner of the fifth aspect, stopping, by the first network device, processing a current HARQ process when a time interval is greater than a preset time period, and transmitting an ACK message to the first UE, where the time interval is from a start of receiving the first uplink air interface data by the first network device to a start of receiving the parsing result of the uplink air interface data of the second UE; and the reconstructing, by the first network device, uplink air interface data of the second UE according to the information about the second UE, and obtaining the reconstructed uplink air interface data of the second UE includes: reconstructing, by the first network device, the uplink air interface data of the second UE according to the information about the second UE when a time point of processing a next HARQ process of the current HARQ process arrives, and obtaining the reconstructed uplink air interface data of the second UE.

With reference to any one of the fifth aspect or the first to the fourth possible implementation manners of the fifth aspect, in a fifth possible implementation manner of the fifth aspect, after the parsing, by the first network device, the second uplink air interface data according to information about the first UE, and obtaining a parsing result of the uplink air interface data of the first UE, the method further includes: transmitting, by the first network device, retransmission information to the first UE by using a PDCCH when the parsing result of the uplink air interface data of the first UE is incorrect.

According to a sixth aspect, an embodiment of the present invention provides an uplink interference processing method. The method includes transmitting, by a second network device, information about second UE to a first network device, where the information about the second UE includes scheduling information of the second UE and configuration information of a serving cell of the second UE, and the second UE accesses the second network device. The method also includes receiving, by the second network device, third uplink air interface data, where the third uplink air interface data includes uplink air interface data of the second UE. The method also includes parsing, by the second network device, the third uplink air interface data according to the information about the second UE, and obtaining a parsing result of the uplink air interface data of the second UE.

In a first possible implementation manner of the sixth aspect, the method further includes: transmitting, by the second network device, the parsing result of the uplink air interface data of the second UE to the first network device.

According to a seventh aspect, an embodiment of the present invention provides an uplink interference processing method. The method includes transmitting, by a first network device, information about first UE to a second network device, where the information about the first UE includes scheduling information of the first UE and configuration information of a serving cell of the first UE, and the first UE accesses the first network device. The method also includes receiving, by the first network device, fourth uplink air interface data, where the fourth uplink air interface data includes uplink air interface data of the first UE. The method also includes parsing, by the first network device, the fourth uplink air interface data according to the information about the first UE, and obtaining a first parsing result of the uplink air interface data of the first UE. The method also includes receiving, by the first network device, indication information and a second parsing result of the uplink air interface data of the first UE that are transmitted by the second network device, where the indication information is used to indicate whether the second parsing result is correct or incorrect, and the second parsing result is a parsing result of the uplink air interface data of the first UE and is obtained by the second network device according to the information about the first UE and air interface data received by the second network device. The method also includes obtaining, by the first network device, a parsing result of the uplink air interface data of the first UE according to the first parsing result, the indication information, and the second parsing result.

In a first possible implementation manner of the seventh aspect, when the first parsing result is correct, the obtaining, by the first network device, a parsing result of the uplink air interface data of the first UE according to the first parsing result, the indication information, and the second parsing result includes: using, by the first network device, the first parsing result as the parsing result of the uplink air interface data of the first UE.

In a second possible implementation manner of the seventh aspect, when the first parsing result is incorrect and the indication information indicates that the second parsing result is correct, the obtaining, by the first network device, a parsing result of the uplink air interface data of the first UE according to the first parsing result, the indication information, and the second parsing result includes: using, by the first network device, the second parsing result as the parsing result of the uplink air interface data of the first UE.

In a third possible implementation manner of the seventh aspect, when the first parsing result is incorrect and the indication information indicates that the second parsing result is incorrect, the obtaining, by the first network device, a parsing result of the uplink air interface data of the first UE according to the first parsing result, the indication information, and the second parsing result includes: combining, by the first network device, the first parsing result and the second parsing result to obtain the parsing result of the uplink air interface data of the first UE.

With reference to the third possible implementation manner of the seventh aspect, in a fourth possible implementation manner of the seventh aspect, after the combining, by the first network device, the first parsing result and the second parsing result to obtain the parsing result of the uplink air interface data of the first UE, the method further includes: transmitting, by the first network device, retransmission information to the first UE by using a PDCCH when the parsing result of the uplink air interface data of the first UE is incorrect.

With reference to any one of the second to the fourth possible implementation manners of the seventh aspect, in a fifth possible implementation manner of the seventh aspect, the method further includes: stopping, by the first network device, processing a current HARQ process when a time interval is greater than a preset time period, and transmitting an ACK message to the first UE, where the time interval is from a start of receiving the fourth uplink air interface data by the first network device to a start of receiving the indication information and the second parsing result; and the obtaining, by the first network device, a parsing result of the uplink air interface data of the first UE according to the first parsing result, the indication information, and the second parsing result includes: obtaining, by the first network device, the parsing result of the uplink air interface data of the first UE according to the first parsing result, the indication information, and the second parsing result when a time point of processing a next HARQ process of the current HARQ process arrives.

According to an eighth aspect, an embodiment of the present invention provides an uplink interference processing method. The method includes receiving, by a second network device, information about first UE that is transmitted by a first network device, where the information about the first UE includes scheduling information of the first UE and configuration information of a serving cell of the first UE, and the first UE accesses the first network device. The method also includes receiving, by the second network device, fifth uplink air interface data, where the fifth uplink air interface data includes uplink air interface data of the first UE and uplink air interface data of second UE, and the second UE accesses the second network device. The method also includes obtaining, by the second network device, a second parsing result of the uplink air interface data of the first UE according to the information about the first UE and the fifth uplink air interface data. The method also includes transmitting, by the second network device, indication information and the second parsing result to the first network device, where the indication information is used to indicate whether the second parsing result is correct or incorrect.

In a first possible implementation manner of the eighth aspect, the obtaining, by the second network device, a second parsing result of the uplink air interface data of the first UE according to the information about the first UE and the fifth uplink air interface data includes: parsing, by the second network device, the fifth uplink air interface data according to the information about the first UE, and obtaining the second parsing result.

In a second possible implementation manner of the eighth aspect, the obtaining, by the second network device, a second parsing result of the uplink air interface data of the first UE according to the information about the first UE and the fifth uplink air interface data includes: parsing, by the second network device, the fifth uplink air interface data according to information about the second UE, and obtaining a parsing result of the uplink air interface data of the second UE, where the information about the second UE includes scheduling information of the second UE and configuration information of a serving cell of the second UE; reconstructing, by the second network device, uplink air interface data of the second UE according to the information about the second UE, information about a channel between the second UE and the second network device, and the parsing result of the uplink air interface data of the second UE, and obtaining the reconstructed uplink air interface data of the second UE; clearing, by the second network device, the reconstructed uplink air interface data of the second UE from the fifth uplink air interface data, and obtaining sixth uplink air interface data; and parsing, by the second network device, the sixth uplink air interface data according to the information about the first UE, and obtaining the second parsing result.

According to a ninth aspect, an embodiment of the present invention provides an uplink interference processing system, including a network device provided in the first aspect of the embodiments of the present invention or various possible implementation manners of the first aspect and a network device provided in the second aspect of the embodiments of the present invention or various possible implementation manners of the second aspect; or including a network device provided in the third aspect of the embodiments of the present invention or various possible implementation manners of the third aspect and a network device provided in the fourth aspect of the embodiments of the present invention or various possible implementation manners of the fourth aspect.

Embodiments of the present invention provide an uplink interference processing method, device and system. The first network device receives the information about second UE that is transmitted by the second network device. After receiving the first uplink air interface data, when the uplink air interface data of the first UE is parsed incorrectly, the first network device reconstructs the uplink air interface data of the second UE according to the information about the second UE to obtain the reconstructed uplink air interface data of the second UE. The reconstructed uplink air interface data of the second UE is cleared from the first uplink air interface data to obtain the second uplink air interface data, so as to reduce or decrease interference from the second UE. The second uplink air interface data is parsed according to the information about the first UE, to obtain a parsing result of the uplink air interface data of the first UE, so as to improve a correct rate of the parsing result of the uplink air interface data of the first UE and improve uplink transmission performance of the first UE. In comparison with the prior art, times of interaction between the first network device and the second network device are reduced, and bandwidth and delay requirements are lowered. When there is a constraint of bandwidth and a delay of an interaction channel between network devices, uplink transmission performance of the UE can be improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Technical solutions of the present invention may be applied to various wireless communications systems, such as a Global System for Mobile communications (GSM for short), a General Packet Radio Service (GPRS for short) system, a Code Division Multiple Access (CDMA for short) system, a CDMA2000 system, a Wideband Code Division Multiple Access (WCDMA for short) system, a Long Term Evolution (LTE for short) system, or a World Interoperability for Microwave Access (WiMAX for short) system.

A first network device and a second network device of the present invention may be base station controllers (BSC for short) in a GSM system, a GPRS system, or a CDMA system, or may be radio network controllers (RNC for short) or NodeBs in a CDMA2000 system or a WCDMA system, or may be evolved NodeBs (eNBs for short) in an LTE system, or may be network elements such as access service network base stations (ASN BS for short) in a WiMAX network.

Figure 1:
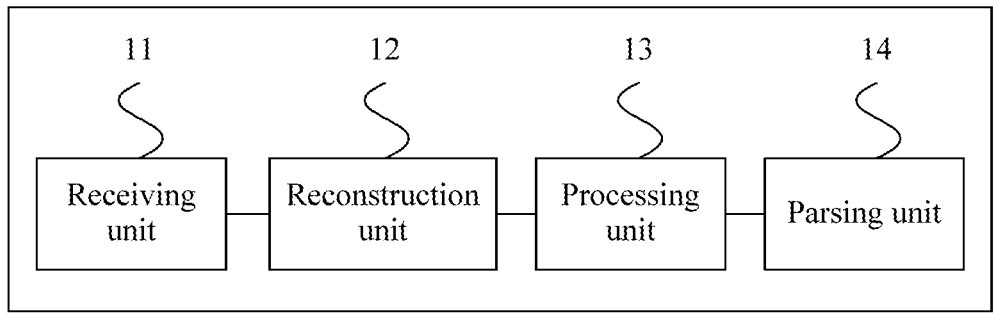
FIG. 1 is a schematic structural diagram of Embodiment 1 of a network device according to the present invention.

FIG. 1 is a schematic structural diagram of Embodiment 1 of a network device according to the present invention. As shown in FIG. 1, the network device in this embodiment serves as a first network device and may include: a receiving unit 11, a reconstruction unit 12, a processing unit 13, and a parsing unit 14. The receiving unit 11 is configured to receive information about second UE that is transmitted by a second network device, where the information about the second UE includes scheduling information of the second UE and configuration information of a serving cell of the second UE, and the second UE accesses the second network device; and receive first uplink air interface data, where the first uplink air interface data includes uplink air interface data of first UE and uplink air interface data of the second UE, and the first UE accesses the first network device. The reconstruction unit 12 is configured to: when the uplink air interface data of the first UE is parsed unsuccessfully, reconstruct uplink air interface data of the second UE according to the information about the second UE that is received by the receiving unit 11, and obtain the reconstructed uplink air interface data of the second UE. The processing unit 13 is configured to: clear, from the first uplink air interface data, the reconstructed uplink air interface data of the second UE that is obtained by the reconstruction unit 12, and obtain second uplink air interface data. The parsing unit 14 is configured to: parse, according to information about the first UE, the second uplink air interface data obtained by the processing unit 13, and obtain a parsing result of the uplink air interface data of the first UE, where the information about the first UE includes scheduling information of the first UE and configuration information of a serving cell of the first UE.

The network device in this embodiment may be used to execute the technical solutions executed by a first network device in any one of method Embodiments 1 to 3 of the present invention. An implementation principle and a technical effect of the network device in this embodiment are similar to those of the first network device, and details are not described herein.

Figure 2:
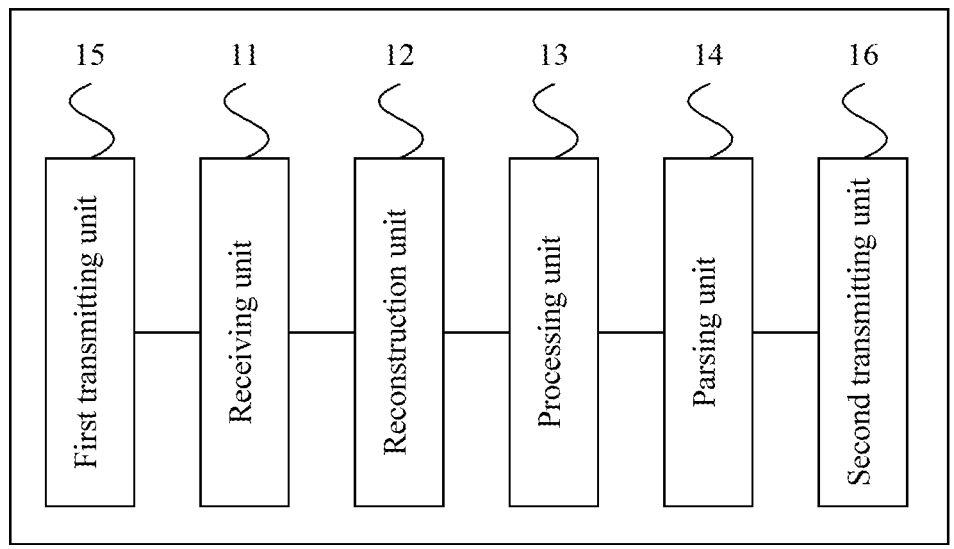
FIG. 2 is a schematic structural diagram of Embodiment 2 of a network device according to the present invention.

FIG. 2 is a schematic structural diagram of Embodiment 2 of a network device according to the present invention. As shown in FIG. 2, optionally, on a basis of the network device structure shown in FIG. 1, in the network device in this embodiment, the reconstruction unit 12 is configured to: reconstruct the uplink air interface data of the second UE according to the information about the second UE, information about a channel from the second UE to the first network device, and a parsing result of the uplink air interface data of the second UE, and obtain the reconstructed uplink air interface data of the second UE.

In a first feasible implementation manner, the parsing unit 14 is further configured to: before the reconstruction unit 12 reconstructs the uplink air interface data of the second UE according to the information about the second UE and obtains the reconstructed uplink air interface data of the second UE, parse the first uplink air interface data according to the information about the second UE, and obtain the parsing result of the uplink air interface data of the second UE.

In a second feasible implementation manner, the receiving unit 11 is further configured to: before the reconstruction unit 12 reconstructs the uplink air interface data of the second UE according to the information about the second UE and obtains the reconstructed uplink air interface data of the second UE, receive the parsing result that is of the uplink air interface data of the second UE and transmitted by the second network device.

Optionally, the network device in this embodiment may further include a first transmitting unit 15. The first transmitting unit 15 is configured to stop processing a current hybrid automatic repeat request HARQ process when a time interval is greater than a preset time period, where the time interval is from a start of receiving the first uplink air interface data by the receiving unit 11 to a start of receiving the parsing result of the uplink air interface data of the second UE. The first transmitting unit 15 is configured to transmit an acknowledgement ACK message to the first UE. That the reconstruction unit 12 reconstructs the uplink air interface data of the second UE according to the information about the second UE and obtains the reconstructed uplink air interface data of the second UE includes: the reconstruction unit 12 is configured to reconstruct the uplink air interface data of the second UE according to the information about the second UE when a time point of processing a next HARQ process of the current HARQ process arrives, and obtain the reconstructed uplink air interface data of the second UE.

Optionally, the network device in this embodiment may further include a second transmitting unit 16. The second transmitting unit 16 is configured to: after the parsing unit 14 parses the second uplink air interface data according to the information about the first UE and obtains the parsing result of the uplink air interface data of the first UE, transmit retransmission information to the first UE by using a physical downlink control channel PDCCH when the parsing result of the uplink air interface data of the first UE is incorrect.

The network device in this embodiment may be used to execute the technical solutions executed by a first network device in any one of method Embodiments 1 to 3 of the present invention. An implementation principle and a technical effect of the network device in this embodiment are similar to those of the first network device, and details are not described herein.

Figure 3:
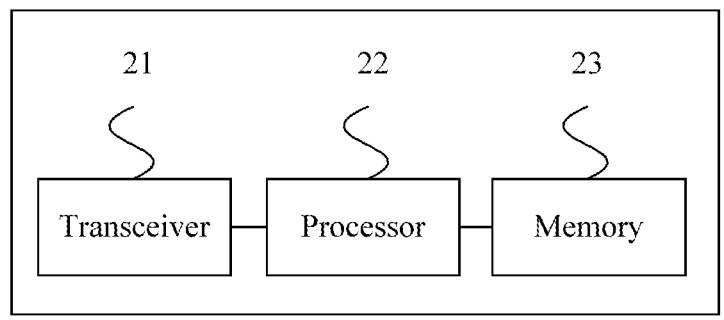
FIG. 3 is a schematic structural diagram of Embodiment 3 of a network device according to the present invention.

In terms of hardware implementation, the receiving unit 11 may be a receiver or a transceiver, and the first transmitting unit 15 and the second transmitting unit 16 may be transmitters or transceivers. The receiving unit 11, the first transmitting unit 15, and the second transmitting unit 16 may be integrated together to form a transceiver unit, which is a transceiver in hardware implementation. The reconstruction unit 12, the processing unit 13, and the parsing unit 14 may be built in or independent of a processor of the network device in a hardware form, or may be stored in a memory of the network device in a software form, so that the processor can conveniently invoke and perform an operation corresponding to each of the foregoing units. The processor may be a central processing unit (CPU for short), a microprocessor, a single-chip microcomputer, or the like. Referring to FIG. 3, FIG. 3 is a schematic structural diagram of Embodiment 3 of a network device according to the present invention. As shown in FIG. 3, the network device in this embodiment includes a transceiver 21 and a processor 22. Certainly, the network device may further include general components such as an antenna, a baseband processing component, an intermediate/radio frequency processing component, and an input/output apparatus, and this embodiment of the present invention sets no limitation thereto. The transceiver 21 and the processor 22 may be configured to execute operations executed by a first network device in the following method Embodiments 1 to 3 of the present invention. Optionally, the network device may further include a memory 23. The memory 23 stores a group of program code, and the processor 22 is configured to invoke the program code stored in the memory 23 to execute operations executed by a first network device in the following method Embodiments 1 to 3 of the present invention.

It should be noted that the network device shown in FIG. 3 may be used to execute the technical solutions executed by the first network device in any one of the following method Embodiments 1 to 3 of the present invention. An implementation principle and a technical effect of the network device in this embodiment are similar to those of the first network device, and details are not described herein.

Figure 4:
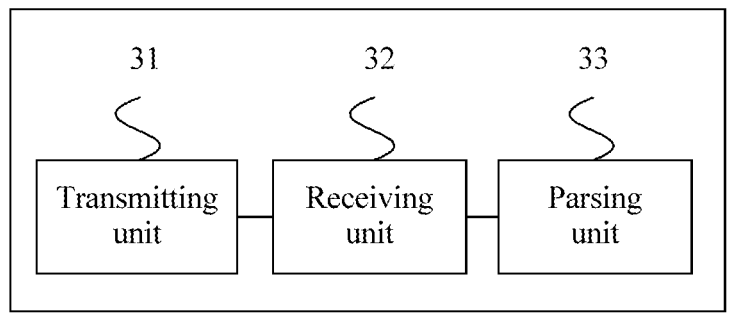
FIG. 4 is a schematic structural diagram of Embodiment 4 of a network device according to the present invention.

FIG. 4 is a schematic structural diagram of Embodiment 4 of a network device according to the present invention. As shown in FIG. 4, the network device in this embodiment serves as a second network device and may include: a transmitting unit 31, a receiving unit 32, and a parsing unit 33. The transmitting unit 31 is configured to transmit information about second UE to a first network device, where the information about the second UE includes scheduling information of the second UE and configuration information of a serving cell of the second UE, and the second UE accesses the second network device. The receiving unit 32 is configured to receive third uplink air interface data, where the third uplink air interface data includes uplink air interface data of the second UE. The parsing unit 33 is configured to: parse, according to the information about the second UE, the third uplink air interface data received by the receiving unit 32, and obtain a parsing result of the uplink air interface data of the second UE.

Optionally, the transmitting unit 31 is further configured to transmit the parsing result of the uplink air interface data of the second UE to the first network device, where the parsing result is obtained by the parsing unit 33.

The network device in this embodiment may be used to execute the technical solutions executed by a second network device in the following method Embodiment 2 or 3 of the present invention. An implementation principle and a technical effect of the network device in this embodiment are similar to those of the second network device, and details are not described herein.

Figure 5:
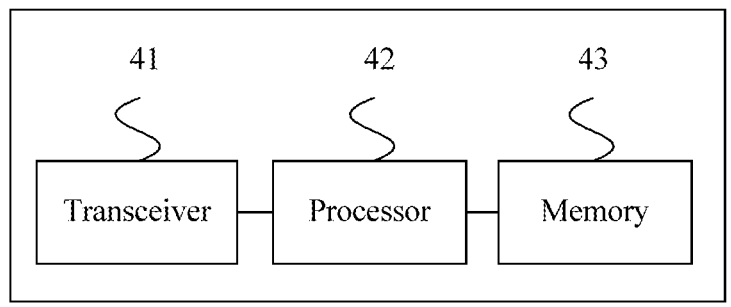
FIG. 5 is a schematic structural diagram of Embodiment 5 of a network device according to the present invention.

In terms of hardware implementation, the transmitting unit 31 may be a transmitter or a transceiver, and the receiving unit 32 may be a receiver or a transceiver. The transmit ting unit 31 and the receiving unit 32 may be integrated together to form a transceiver unit, which is a transceiver in hardware implementation. The parsing unit 33 may be built in or independent of a processor of the network device in a hardware form, or may be stored in a memory of the network device in a software form, so that the processor can conveniently invoke and perform an operation corresponding to each of the foregoing units. The processor may be a CPU, a microprocessor, a single-chip microcomputer, or the like. Referring to FIG. 5, FIG. 5 is a schematic structural diagram of Embodiment 5 of a network device according to the present invention. As shown in FIG. 5, the network device in this embodiment includes a transceiver 41 and a processor 42. Certainly, the network device may further include general components such as an antenna, a baseband processing component, an intermediate/radio frequency processing component, and an input/output apparatus, and this embodiment of the present invention sets no limitation thereto. The transceiver 41 and the processor 42 may be configured to execute operations executed by a first network device in the following method Embodiment 2 or 3 of the present invention. Optionally, the network device may further include a memory 43. The memory 43 stores a group of program code, and the processor 42 is configured to invoke the program code stored in the memory 43 to execute operations executed by a second network device in the following method Embodiment 2 or 3 of the present invention.

It should be noted that the network device shown in FIG. 5 may be used to execute the technical solutions executed by the second network device in the following method Embodiment 2 or 3 of the present invention. An implementation principle and a technical effect of the network device in this embodiment are similar to those of the second network device, and details are not described herein.

Figure 6:
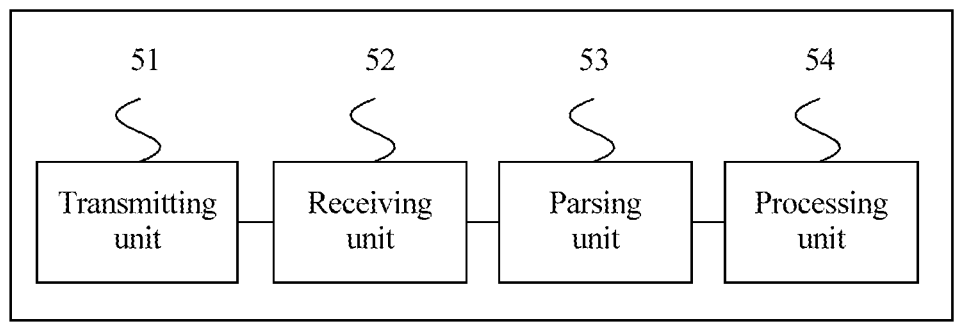
FIG. 6 is a schematic structural diagram of Embodiment 6 of a network device according to the present invention.

FIG. 6 is a schematic structural diagram of Embodiment 6 of a network device according to the present invention. As shown in FIG. 6, the network device in this embodiment serves as a first network device and may include: a transmitting unit 51, a receiving unit 52, a parsing unit 53, and a processing unit 54. The transmitting unit 51 is configured to transmit information about first UE to a second network device, where the information about the first UE includes scheduling information of the first UE and configuration information of a serving cell of the first UE, and the first UE accesses the first network device. The receiving unit 52 is configured to receive fourth uplink air interface data, where the fourth uplink air interface data includes uplink air interface data of the first UE. The parsing unit 53 is configured to: parse the fourth uplink air interface data according to the information about the first UE, and obtain a first parsing result of the uplink air interface data of the first UE. The receiving unit 52 is further configured to receive indication information and a second parsing result of the uplink air interface data of the first UE that are transmitted by the second network device, where the indication information is used to indicate whether the second parsing result is correct or incorrect, and the second parsing result is a parsing result of the uplink air interface data of the first UE and is obtained by the second network device according to the information about the first UE and air interface data received by the second network device. The processing unit 54 is configured to obtain a parsing result of the uplink air interface data of the first UE according to the first parsing result obtained by the parsing unit 53 and the indication information and the second parsing result that are received by the receiving unit 52.

Optionally, the processing unit 54 is configured to use the first parsing result as the parsing result of the uplink air interface data of the first UE when the first parsing result is correct.

Optionally, the processing unit 54 is configured to use the second parsing result as the parsing result of the uplink air interface data of the first UE when the first parsing result is incorrect and the indication information indicates that the second parsing result is correct.

Optionally, the processing unit 54 is configured to: when the first parsing result is incorrect and the indication information indicates that the second parsing result is incorrect, combine the first parsing result and the second parsing result to obtain the parsing result of the uplink air interface data of the first UE.

Optionally, the transmitting unit 51 is further configured to: after the processing unit 54 combines the first parsing result and the second parsing result to obtain the parsing result of the uplink air interface data of the first UE, transmit retransmission information to the first UE by using a physical downlink control channel PDCCH when the parsing result of the uplink air interface data of the first UE is incorrect.

Optionally, the processing unit 54 is further configured to stop processing a current hybrid automatic repeat request HARQ process when a time interval is greater than a preset time period, where the time interval is from a start of receiving the fourth uplink air interface data by the receiving unit 52 to a start of receiving the indication information and the second parsing result.

The transmitting unit 51 is further configured to transmit an acknowledgement ACK message to the first UE.

That the processing unit 54 obtains the parsing result of the uplink air interface data of the first UE according to the first parsing result, the indication information, and the second parsing result includes: the processing unit 54 is configured to obtain, by the first network device, the parsing result of the uplink air interface data of the first UE according to the first parsing result, the indication information, and the second parsing result when a time point of processing a next HARQ process of the current HARQ process arrives.

The network device in this embodiment may be used to execute the technical solutions executed by a first network device in any one of method Embodiments 4 to 7 of the present invention. An implementation principle and a technical effect of the network device in this embodiment are similar to those of the first network device, and details are not described herein.

Figure 7:
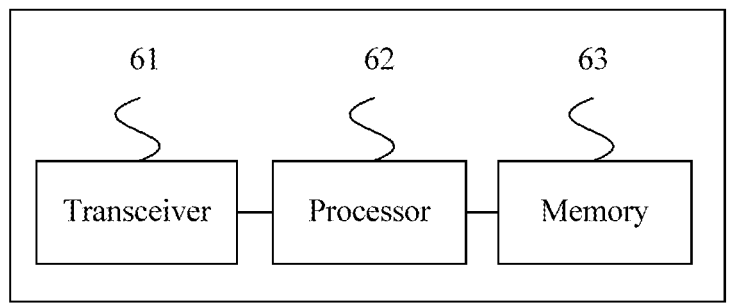
FIG. 7 is a schematic structural diagram of Embodiment 7 of a network device according to the present invention.

In terms of hardware implementation, the transmitting unit 51 may be a transmitter or a transceiver, and the receiving unit 52 may be a receiver or a transceiver. The transmitting unit 51 and the receiving unit 52 may be integrated together to form a transceiver unit, which is a transceiver in hardware implementation. The parsing unit 53 and the processing unit 54 may be built in or independent of a processor of the network device in a hardware form, or may be stored in a memory of the network device in a software form, so that the processor can conveniently invoke and perform an operation corresponding to each of the foregoing units. The processor may be a CPU, a microprocessor, a single-chip microcomputer, or the like. Referring to FIG. 7, FIG. 7 is a schematic structural diagram of Embodiment 7 of a network device according to the present invention. As shown in FIG. 7, the network device in this embodiment includes a transceiver 61 and a processor 62. Certainly, the network device may further include general components such as an antenna, a baseband processing component, an intermediate/radio frequency processing component, and an input/output apparatus, and this embodiment of the present invention sets no limitation thereto. The transceiver 61 and the processor 62 may be configured to execute operations executed by a first network device in the following method Embodiments 4 to 7 of the present invention. Optionally, the network device may further include a memory 63. The memory 63 stores a group of program code, and the processor 62 is configured to invoke the program code stored in the memory 63 to execute operations executed by a first network device in the following method Embodiments 4 to 7 of the present invention.

It should be noted that the network device shown in FIG. 7 may be used to execute the technical solutions executed by the first network device in any one of the following method Embodiments 4 to 7 of the present invention. An implementation principle and a technical effect of the network device in this embodiment are similar to those of the first network device, and details are not described herein.

Figure 8:
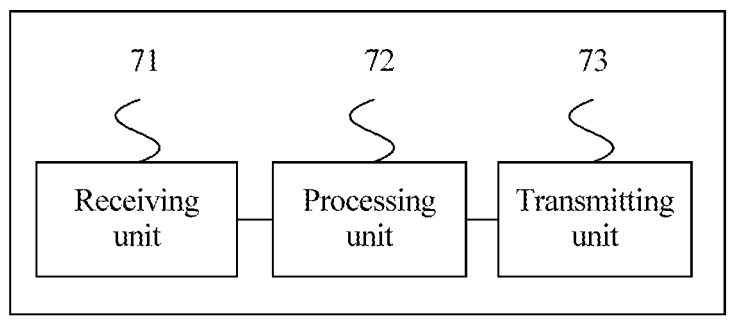
FIG. 8 is a schematic structural diagram of Embodiment 8 of a network device according to the present invention.

FIG. 8 is a schematic structural diagram of Embodiment 8 of a network device according to the present invention. As shown in FIG. 8, the network device in this embodiment serves as a second network device and may include: a receiving unit 71, a processing unit 72, and a transmitting unit 73. The receiving unit 71 is configured to receive information about first UE transmitted by a first network device, where the information about the first UE includes scheduling information of the first UE and configuration information of a serving cell of the first UE, and the first UE accesses the first network device; and receive fifth uplink air interface data, where the fifth uplink air interface data includes uplink air interface data of the first UE and uplink air interface data of second UE, and the second UE accesses the second network device. The processing unit 72 is configured to obtain a second parsing result of the uplink air interface data of the first UE according to the information about the first UE and the fifth uplink air interface data that are received by the receiving unit 71. The transmitting unit 73 is configured to transmit indication information and the second parsing result to the first network device, where the indication information is used to indicate whether the second parsing result is correct or incorrect.

Optionally, the processing unit 72 is configured to: parse the fifth uplink air interface data according to the information about the first UE, and obtain the second parsing result.

Optionally, the processing unit 72 is configured to: parse the fifth uplink air interface data according to information about the second UE, and obtain a parsing result of the uplink air interface data of the second UE, where the information about the second UE includes scheduling information of the second UE and configuration information of a serving cell of the second UE; reconstruct uplink air interface data of the second UE according to the information about the second UE, information about a channel between the second UE and the second network device, and the parsing result of the uplink air interface data of the second UE, and obtain the reconstructed uplink air interface data of the second UE; clear the reconstructed uplink air interface data of the second UE from the fifth uplink air interface data, and obtain sixth uplink air interface data; and parse the sixth uplink air interface data according to the information about the first UE, and obtain the second parsing result.

The network device in this embodiment may be used to execute the technical solutions executed by a second network device in any one of method Embodiments 5 to 7 of the present invention. An implementation principle and a technical effect of the network device in this embodiment are similar to those of the second network device, and details are not described herein.

Figure 9:
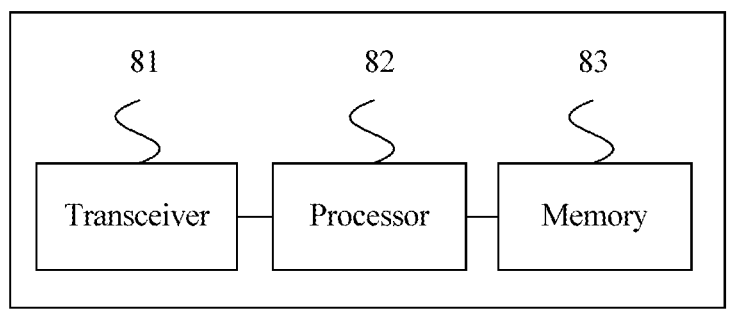
FIG. 9 is a schematic structural diagram of Embodiment 9 of a network device according to the present invention.

In terms of hardware implementation, the receiving unit 71 may be a receiver or a transceiver, and the transmitting unit 73 may be a transmitter or a transceiver. The receiving unit 71 and the transmitting unit 73 may be integrated together to form a transceiver unit, which is a transceiver in hardware implementation. The processing unit 72 may be built in or independent of a processor of the network device in a hardware form, or may be stored in a memory of the network device in a software form, so that the processor can conveniently invoke and perform an operation corresponding to each of the foregoing units. The processor may be a CPU, a microprocessor, a single-chip microcomputer, or the like. Referring to FIG. 9, FIG. 9 is a schematic structural diagram of Embodiment 9 of a network device according to the present invention. As shown in FIG. 9, the network device in this embodiment includes a transceiver 81 and a processor 82. Certainly, the network device may further include general components such as an antenna, a baseband processing component, an intermediate/radio frequency processing component, and an input/output apparatus, and this embodiment of the present invention sets no limitation thereto. The transceiver 8i and the processor 82 may be configured to execute operations executed by a second network device in the following method Embodiments 5 to 7 of the present invention. Optionally, the network device may further include a memory 83. The memory 83 stores a group of program code, and the processor 82 is configured to invoke the program code stored in the memory 83 to execute operations executed by a second network device in the following method Embodiments 5 to 7 of the present invention.

It should be noted that the network device shown in FIG. 9 may be used to execute the technical solutions executed by the second network device in any one of the following method Embodiments 5 to 7 of the present invention. An implementation principle and a technical effect of the network device in this embodiment are similar to those of the second network device, and details are not described herein.

Figure 10:
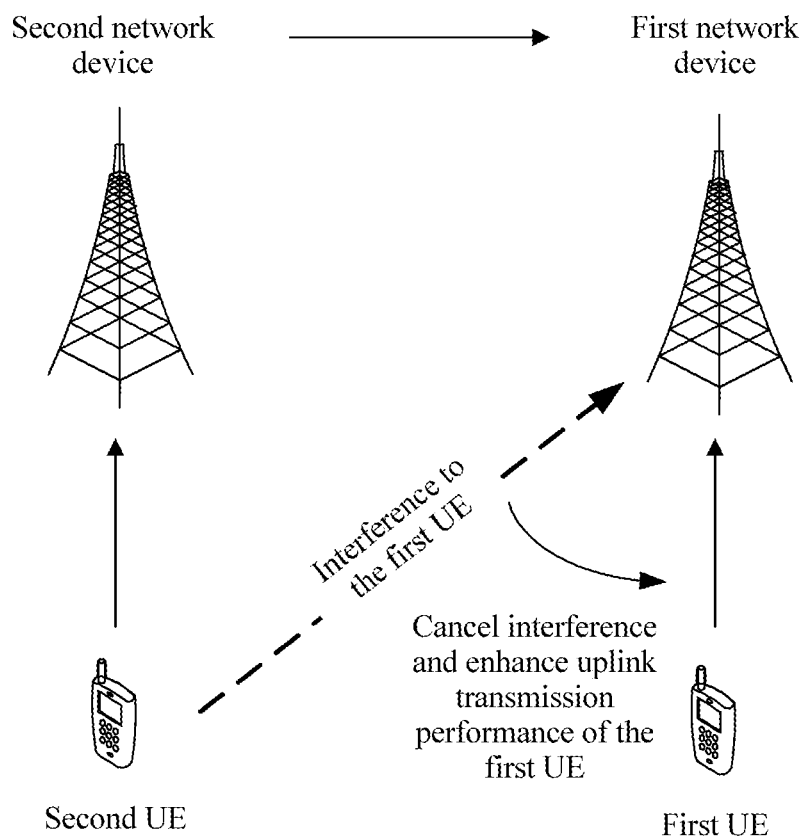
FIG. 10 is a first schematic diagram of an application scenario according to an embodiment of the present invention.

FIG. 10 is a first schematic diagram of an application scenario according to an embodiment of the present invention. As shown in FIG. 10, first UE accesses a first network device, and second UE accesses a second network device. Uplink air interface data transmitted by the second UE is received by the first network device. Consequently, the uplink air interface data that is received by the first network device and transmitted by the second UE becomes interference to uplink air interface data transmitted by the first UE, thereby reducing uplink transmission performance of the first UE. The following method embodiments of the present invention may be used to resolve the foregoing problem.

Figure 11:
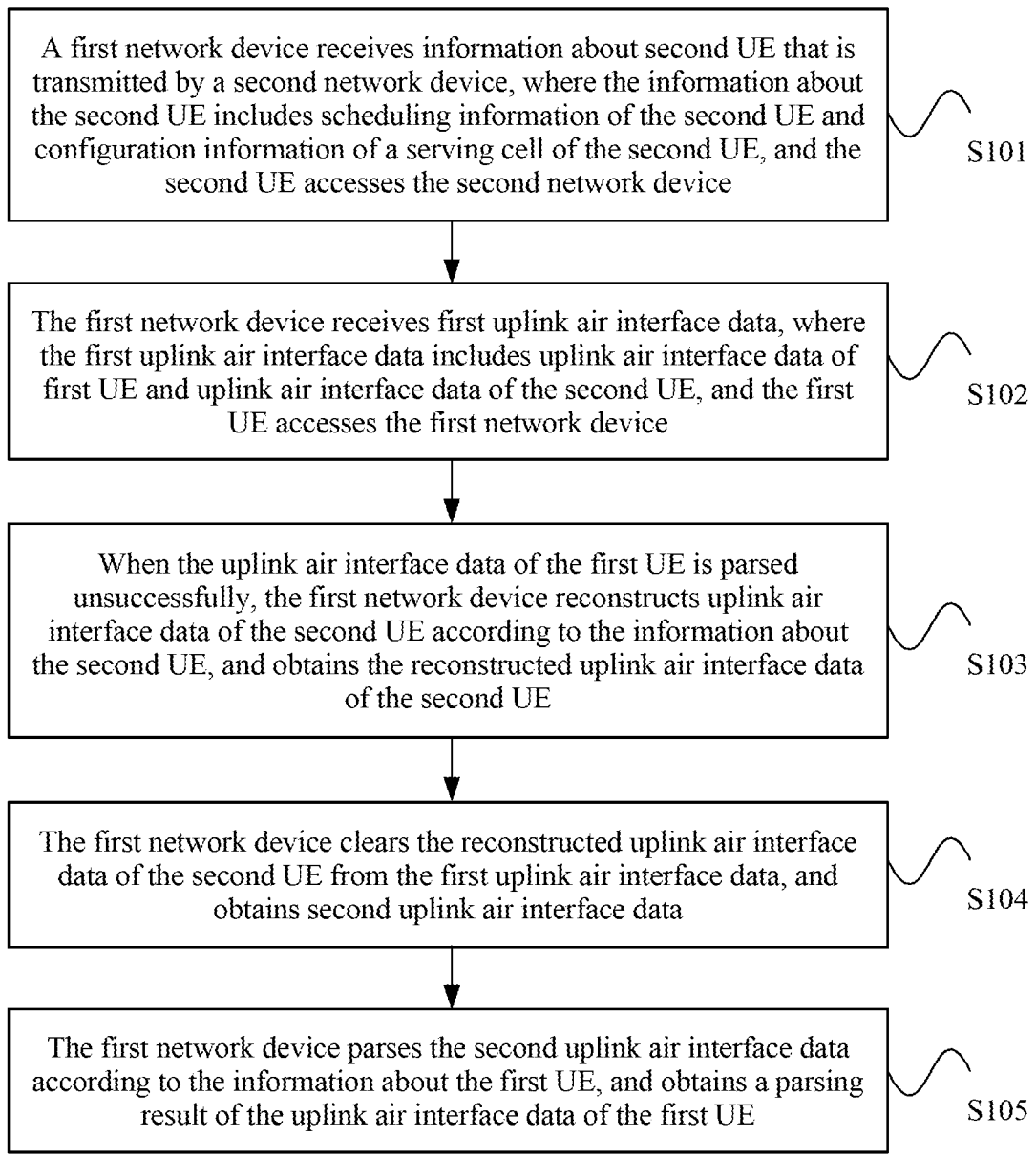
FIG. 11 is a flowchart of Embodiment 1 of an uplink interference processing method according to the present invention.

FIG. 11 is a flowchart of Embodiment 1 of an uplink interference processing method according to the present invention. As shown in FIG. 11, the method in this embodiment may include the following steps.

S101. A first network device receives information about second UE that is transmitted by a second network device, where the information about the second UE includes scheduling information of the second UE and configuration information of a serving cell of the second UE, and the second UE accesses the second network device.

In this embodiment, the first network device may receive the information about the second UE that is transmitted by the second network device, and the second UE accesses the second network device. That is, the second network device is a serving network device of the second UE, and the information about the second UE includes the scheduling information of the second UE and the configuration information of the serving cell of the second UE. The serving cell of the second UE is a cell in a coverage area of the second network device. The scheduling information is used to indicate a time-frequency resource for transmitting data, and the configuration information of the serving cell includes an identity (English: Identity, ID for short) of the serving cell and a pilot configuration format.

S102. The first network device receives first uplink air interface data, where the first uplink air interface data includes uplink air interface data of first UE and uplink air interface data of the second UE, and the first UE accesses the first network device.

In this embodiment, the first network device may receive the first uplink air interface data. The first uplink air interface data includes the uplink air interface data of the first UE and the uplink air interface data of the second UE. Optionally, the first uplink air interface data may further include uplink air interface data of another UE. The first UE accesses the first network device. That is, the first network device is a serving network device of the first UE. The uplink air interface data of the first UE is uplink air interface data transmitted by the first UE, and the uplink air interface data transmitted by the first UE may be received by another network device in addition to the first network device. The uplink air interface data of the second UE is uplink air interface data transmitted by the second UE, and the uplink air interface data transmitted by the second UE is received by the first network device and the second network device, but another device is restricted to receive the uplink air interface data transmitted by the second UE.

It should be noted that an execution sequence between S101 and S102 is not limited.

S103. When the uplink air interface data of the first UE is parsed unsuccessfully, the first network device reconstructs uplink air interface data of the second UE according to the information about the second UE, and obtains the reconstructed uplink air interface data of the second UE.

In this embodiment, after the first network device receives the first uplink air interface data, the first network device parses the first uplink air interface data according to the information about the first UE to obtain a parsing result of the uplink air interface data of the first UE. The information about the first UE includes the scheduling information of the first UE and the configuration information of the serving cell of the first UE. The information about the first UE is configured by the first network device. When the parsing result that is of the uplink air interface data of the first UE and obtained by parsing is correct, it indicates that the uplink air interface data of the first UE is parsed successfully. When the uplink air interface data of the first UE that is obtained by parsing is incorrect, it indicates that the uplink air interface data of the first UE is parsed unsuccessfully. When the uplink air interface data of the first UE is parsed unsuccessfully, the first network device reconstructs the uplink air interface data of the second UE according to the information about the second UE, and obtains the reconstructed uplink air interface data of the second UE. Therefore, the first network device in this embodiment does not need to obtain the reconstructed uplink air interface data of the second UE from the second network device, but the first network device obtains the uplink air interface data by reconstructing, thereby lowering bandwidth and delay requirements.

S104. The first network device clears the reconstructed uplink air interface data of the second UE from the first uplink air interface data, and obtains second uplink air interface data.

In this embodiment, the first network device clears the reconstructed uplink air interface data of the second UE from the first uplink air interface data, and obtains the second uplink air interface data, thereby canceling or reducing interference caused by the uplink air interface data of the second UE to the uplink air interface data of first UE.

S105. The first network device parses the second uplink air interface data according to the information about the first UE, and obtains a parsing result of the uplink air interface data of the first UE.

In this embodiment, after the first network device obtains the second uplink air interface data in which the interference caused by the uplink air interface data of the second UE is canceled or reduced, the first network device parses the second uplink air interface data according to the information about the first UE, and obtains a parsing result of the uplink air interface data of the first UE. The interference caused by the uplink air interface data of the second UE is canceled or reduced in the uplink air interface data that is used as a basis for obtaining the parsing result of the uplink air interface data of the first UE. Therefore, a correct rate of the obtained parsing result of the uplink air interface data of the first UE is improved, and uplink transmission performance of the first UE is improved.

In this embodiment, the first network device receives the information about the second UE that is transmitted by the second network device. After receiving the first uplink air interface data, when the uplink air interface data of the first UE is parsed incorrectly, the first network device reconstructs the uplink air interface data of the second UE according to the information about the second UE to obtain the reconstructed uplink air interface data of the second UE. The reconstructed uplink air interface data of the second UE is cleared from the first uplink air interface data to obtain the second uplink air interface data, so as to reduce or decrease interference from the second UE. According to the information about the first UE, the second uplink air interface data is parsed to obtain the parsing result of the uplink air interface data of the first UE, so as to improve a correct rate of the parsing result of the uplink air interface data of the first UE and improve uplink transmission performance of the first UE. In comparison with the prior art, times of interaction between the first network device and the second network device are reduced, and bandwidth and delay requirements are lowered. When there is a constraint of bandwidth and a delay of an interaction channel between network devices, uplink transmission performance of the UE can be improved.

Figure 12:
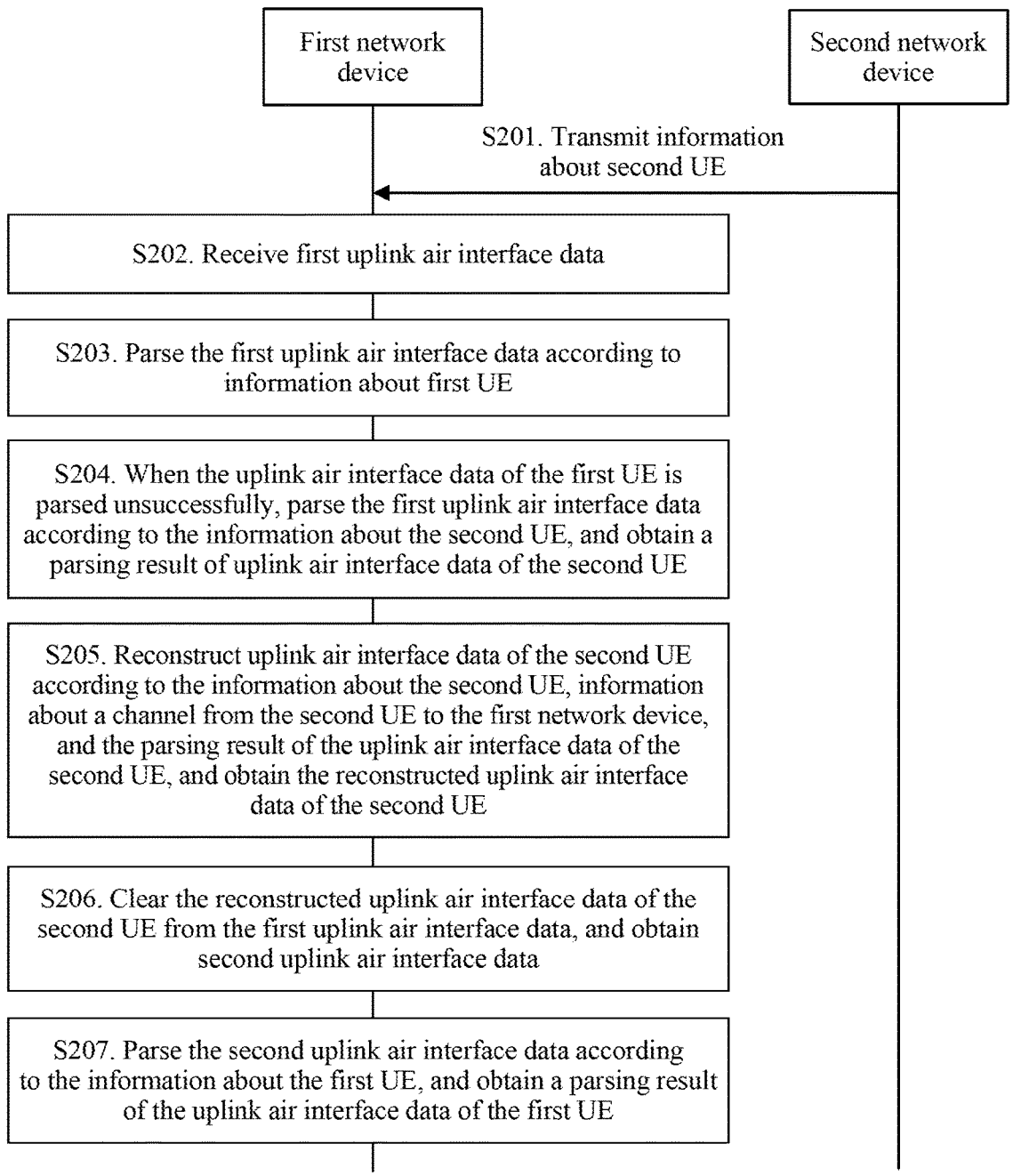
FIG. 12 is a flowchart of Embodiment 2 of an uplink interference processing method according to the present invention.

FIG. 12 is a flowchart of Embodiment 2 of an uplink interference processing method according to the present invention. As shown in FIG. 12, the method in this embodiment may include the following steps.

S201. A second network device transmits information about second UE to a first network device.

In this embodiment, correspondingly, the first network device receives the information about the second UE that is transmitted by the second network device. The information about the second UE includes scheduling information of the second UE and configuration information of a serving cell of the second UE, and the second UE accesses the second network device.

In this embodiment, the second network device may use a neighboring cell management frame to carry the information about the second UE, and transmit the neighboring cell management frame to the first network device, and a delay 1 of interaction between the first network device and the second network device exists herein. The first network device receives and parses the neighboring cell management frame, and obtains the information about the second UE from the neighboring cell management frame.

It should be noted that after performing S201, the second network device receives third uplink air interface data, where the third uplink air interface data includes uplink air interface data of the second UE; and parses the first uplink air interface data according to the information about the second UE to obtain a parsing result of the uplink air interface data of the second UE.

S202. The first network device receives first uplink air interface data.

For a specific implementation process of S202 in this embodiment, reference may be made to the related description in method Embodiment 1 of the present invention, and no repeated description is given herein any further.

S203. The first network device parses the first uplink air interface data according to information about first UE.

In this embodiment, after receiving the first uplink air interface data, the first network device parses the first uplink air interface data according to the information about the first UE to obtain a parsing result of the uplink air interface data of the first UE. When the parsing result of the uplink air interface data of the first UE is correct, it indicates that the uplink air interface data of the first UE is parsed successfully, and the first network device may report the parsing result of the uplink air interface data of the first UE to a medium access control (MAC) layer, and perform subsequent scheduling. When the parsing result of the uplink air interface data of the first UE is incorrectly, it indicates that the uplink air interface data of the first UE is parsed unsuccessfully, and S204 is performed.

S204. When the uplink air interface data of the first UE is parsed unsuccessfully, the first network device parses the first uplink air interface data according to the information about the second UE, and obtains a parsing result of uplink air interface data of the second UE.

In this embodiment, when the uplink air interface data of the first UE is parsed unsuccessfully, the first network device parses the first uplink air interface data according to the information about the second UE, and obtains a parsing result of the uplink air interface data of the second UE. No matter whether the parsing result of the uplink air interface data of the second UE is correct, the first network device performs S205.

S205. The first network device reconstructs uplink air interface data of the second UE according to the information about the second UE, information about a channel from the second UE to the first network device, and the parsing result of the uplink air interface data of the second UE, and obtains the reconstructed uplink air interface data of the second UE.

In this embodiment, the first network device reconstructs the uplink air interface data of the second UE according to the information about the second UE, the information about a channel between the second UE and the first network device, and the parsing result that is of the uplink air interface data of the second UE and obtained in S204, and obtains the reconstructed uplink air interface data of the second UE. The reconstructed uplink air interface data of the second UE may be not exactly the same as the uplink air interface data of the second UE. The information about the channel between the second UE and the first network device is obtained by the first network device by estimating the channel from the second UE to the first network device. The channel estimation is similar to that in the prior art, and details are not described herein.

S206. The first network device clears the reconstructed uplink air interface data of the second UE from the first uplink air interface data, and obtains second uplink air interface data.

In this embodiment, the first network device may delete the reconstructed uplink air interface data of the second UE from the first uplink air interface data to obtain the second uplink air interface data. The uplink air interface data of the second UE is canceled or reduced from the obtained second uplink air interface data, that is, interference air interface data from the second UE is reduced.

S207. The first network device parses the second uplink air interface data according to the information about the first UE, and obtains a parsing result of the uplink air interface data of the first UE.

For a specific implementation process of S207 in this embodiment, reference may be made to the specific implementation process of S103 in method Embodiment 1 of the present invention, and no repeated description is given herein any further.

Optionally, when the parsing result that is of the uplink air interface data of the first UE and obtained in S207 is correct, the first network device may report the parsing result of the uplink air interface data of the first UE to a MAC layer and perform subsequent scheduling. When the parsing result of the uplink air interface data of the first UE is incorrect, the first network device may further transmit retransmission information to the first UE by using a physical downlink control channel (PDCCH for short). After receiving the retransmission information, the first UE retransmits uplink air interface data of the first UE.

According to the uplink interference processing method provided in the embodiment of the present invention, the second network device transmits the information about the second UE to the first network device. The first network device receives the first uplink air interface data, and parses the first uplink air interface data according to the information about the first UE. When the uplink air interface data of the first UE is parsed unsuccessfully, the first network device parses the first uplink air interface according to the information about the second UE to obtain a parsing result of the uplink air interface data of the second UE; reconstructs the air interface data according to the information about the channel from the second UE to the first network device and the parsing result of the uplink air interface data of the second UE, to obtain the reconstructed uplink air interface data of the second UE; clears the reconstructed uplink air interface data of the second UE from the first uplink air interface data to obtain the second uplink air interface data; and then parses the second uplink air interface data according to the information about the first UE to obtain the parsing result of the uplink air interface data of the first UE. This can improve a correct rate of the parsing result of the uplink air interface data of the first UE and improve uplink transmission performance of the first UE. In addition, the first network device interacts with the second network device once, and the interaction is unidirectional transmission, thereby lowering bandwidth and delay requirements. When there is a constraint of bandwidth and a delay of an interaction channel between network devices, uplink transmission performance of the first UE can be improved.

Figure 13:
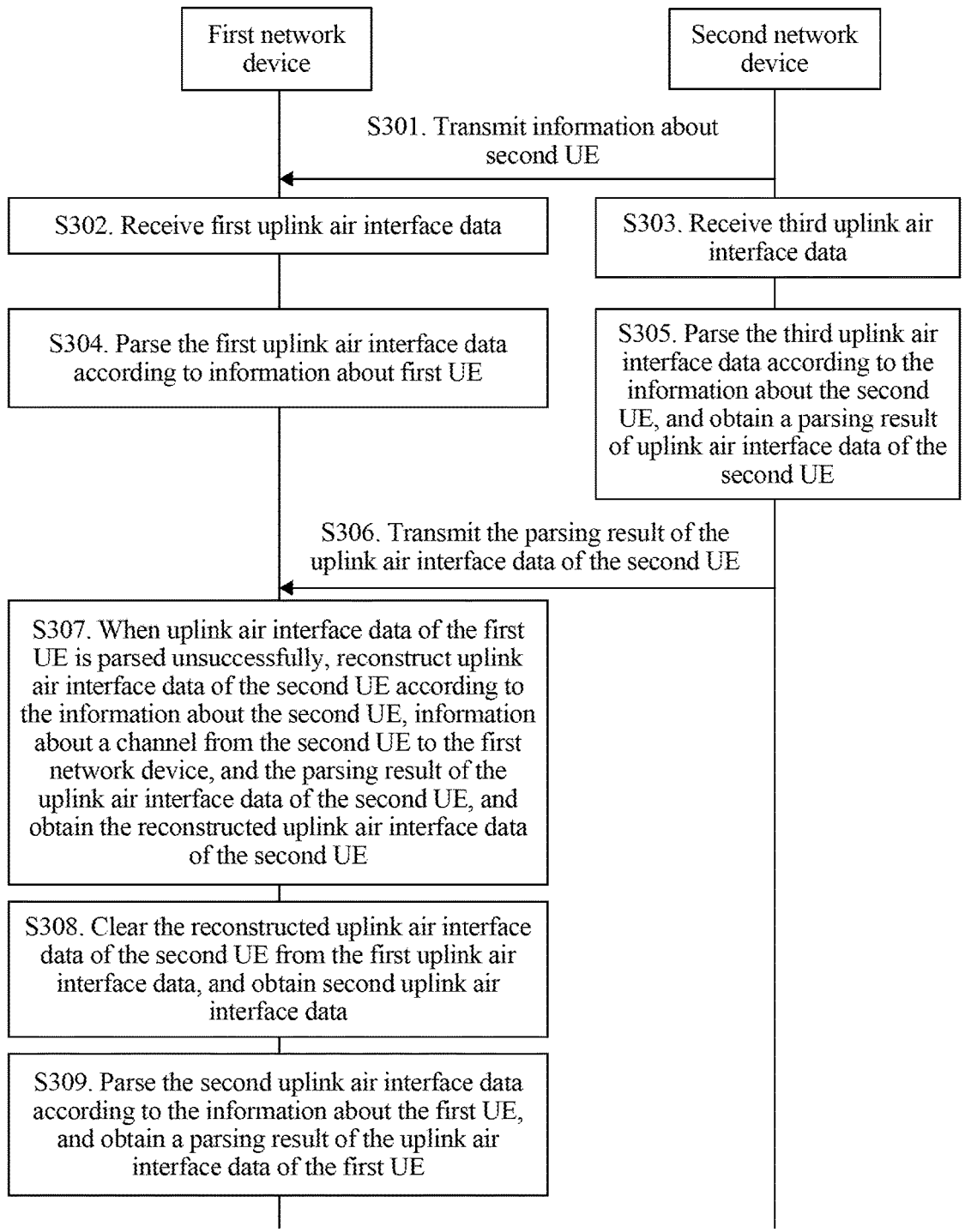
FIG. 13 is a flowchart of Embodiment 3 of an uplink interference processing method according to the present invention.

FIG. 13 is a flowchart of Embodiment 3 of an uplink interference processing method according to the present invention. As shown in FIG. 13, the method in this embodiment may include the following steps.

S301. A second network device transmits information about second UE to a first network device.

S302. The first network device receives first uplink air interface data.

For a specific implementation process of S301 and S302 in this embodiment, reference may be made to the specific implementation process of S201 and S202 in method Embodiment 2 of the present invention, and no repeated description is given herein any further.

S303. The second network device receives third uplink air interface data.

In this embodiment, the second network device may receive the third uplink air interface data. The third uplink air interface data includes uplink air interface data of the second UE. Optionally, the third uplink air interface data may further include uplink air interface data of another UE such as the first UE.

S304. The first network device parses the first uplink air interface data according to information about first UE.

In this embodiment, after receiving the first uplink air interface data, the first network device parses the first uplink air interface data according to the information about the first UE to obtain a parsing result of uplink air interface data of the first UE. When the parsing result of the uplink air interface data of the first UE is correct, it indicates that the uplink air interface data of the first UE is parsed successfully, and the first network device may report the parsing result of the uplink air interface data of the first UE to a MAC layer, and perform subsequent scheduling. When the uplink air interface data of the first UE is parsed incorrectly, it indicates that the uplink air interface data of the first UE is parsed unsuccessfully, and S307 is performed.

S305. The second network device parses the third uplink air interface data according to the information about the second UE, and obtains a parsing result of uplink air interface data of the second UE.

S306. The second network device transmits the parsing result of the uplink air interface data of the second UE to the first network device.

In this embodiment, after receiving the third uplink air interface data, the second network device parses the third uplink air interface data according to the information about the second UE to obtain a parsing result of the uplink air interface data of the second UE, and transmits the parsing result of the uplink air interface data of the second UE to the first network device. Correspondingly, after receiving the parsing result that is of the uplink air interface data of the second UE and transmitted by the second network device, the first network device performs S307.

S307. When uplink air interface data of the first UE is parsed unsuccessfully, the first network device reconstructs uplink air interface data of the second UE according to the information about the second UE, information about a channel from the second UE to the first network device, and the parsing result of the uplink air interface data of the second UE, and obtains the reconstructed uplink air interface data of the second UE.

S308. The first network device clears the reconstructed uplink air interface data of the second UE from the first uplink air interface data, and obtains second uplink air interface data.

S309. The first network device parses the second uplink air interface data according to the information about the first UE, and obtains a parsing result of the uplink air interface data of the first UE.

A specific implementation process of S307-S309 in this embodiment is similar to the specific implementation process of S205-S207 in method Embodiment 2 of the present invention, and no repeated description is given herein any further.

According to the uplink interference processing method provided in the embodiment of the present invention, the second network device transmits the information about the second UE to the first network device. The first network device receives the first uplink air interface data, and may further receive the parsing result that is of the uplink air interface data of the second UE and transmitted by the second network device, and parse the first uplink air interface data according to the information about the first UE. When the uplink air interface data of the first UE is parsed unsuccessfully, the first network device reconstructs the air interface data according to the information about the second UE, the information about the channel from the second UE to the first network device, and the parsing result of the uplink air interface data of the second UE, to obtain the reconstructed uplink air interface data of the second UE; clears the reconstructed uplink air interface data of the second UE from the first uplink air interface data to obtain the second uplink air interface data; and then parses the second uplink air interface data according to the information about the first UE to obtain the parsing result of the uplink air interface data of the first UE. This can improve a correct rate of the parsing result of the uplink air interface data of the first UE and improve uplink transmission performance of the first UE. In addition, the first network device interacts with the second network device twice, and the interaction is unidirectional transmission, thereby lowering bandwidth and delay requirements. When there is a constraint of bandwidth and a delay of an interaction channel between network devices, uplink transmission performance of the first UE can be improved.

On a basis of method Embodiment 3 of the present invention, optionally, before S307 is performed, the first network device may determine whether a time interval is greater than a preset time period, where the time interval is from a start of receiving the first uplink air interface data by the first network device to a start of receiving the parsing result of the uplink air interface data of the second UE. When the time interval is not greater than the preset time period, the first network device performs S307, where the time interval is from the start of receiving the first uplink air interface data by the first network device to the start of receiving the parsing result of the uplink air interface data of the second UE. When the time interval is greater than the preset time period, the first network device stops processing a current HARQ process and transmits an ACK message to the first UE, where the time interval is from the start of receiving the first uplink air interface data by the first network device to the start of receiving the parsing result of the uplink air interface data of the second UE; and the first network device performs S306 when a time point of processing a next HARQ process of the current HARQ process arrives.

Optionally, when the time interval is greater than the preset time period, the first network device does not perform S306-S308, but transmits a negative acknowledgement (NACK for short) to the first UE, where the time interval is from the start of receiving the first uplink air interface data by the first network device to the start of receiving the parsing result of the uplink air interface data of the second UE.

Figure 14:
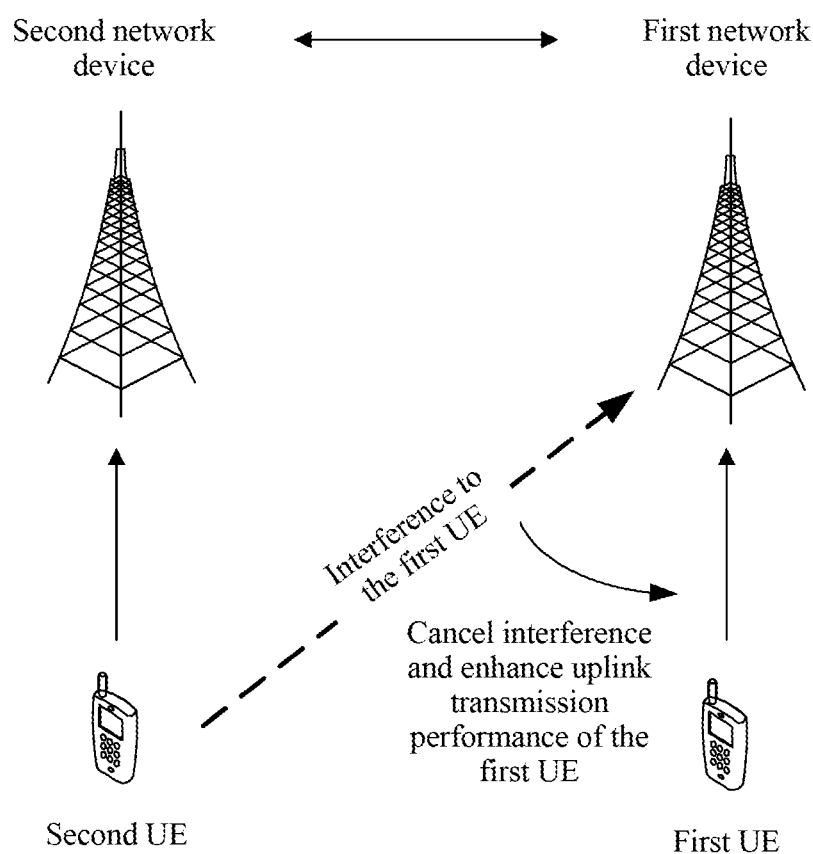
FIG. 14 is a second schematic diagram of an application scenario according to an embodiment of the present invention.

FIG. 14 is a second schematic diagram of an application scenario according to an embodiment of the present invention. As shown in FIG. 14, first UE accesses a first network device, and second UE accesses a second network device. Uplink air interface data transmitted by the second UE is received by the first network device. Consequently, the uplink air interface data that is received by the first network device and transmitted by the second UE becomes interference to uplink air interface data transmitted by the first UE, thereby reducing uplink transmission performance of the first UE. In the prior art, the first network device transmits information about the first UE to the second network device. After receiving uplink air interface data, the second network device obtains a parsing result of the uplink air interface data of the second UE, performs reconstruction to obtain reconstructed uplink air interface data of the second UE, clears the reconstructed uplink air interface data of the second UE from the uplink air interface data, and transmits uplink air interface data obtained after the clearing to the first network device. The first network device obtains a parsing result of the uplink air interface data of the first UE according to the uplink air interface data received by the first network device and the uplink air interface data transmitted by the second network device, thereby improving uplink transmission performance of the first UE. However, massive data needs to be exchanged between the first network device and the second network device, and it is difficult to implement the foregoing solution when a bandwidth constraint exists on an interaction channel. The following method embodiments provided in the present invention may be used to resolve the foregoing problem.

Figure 15:
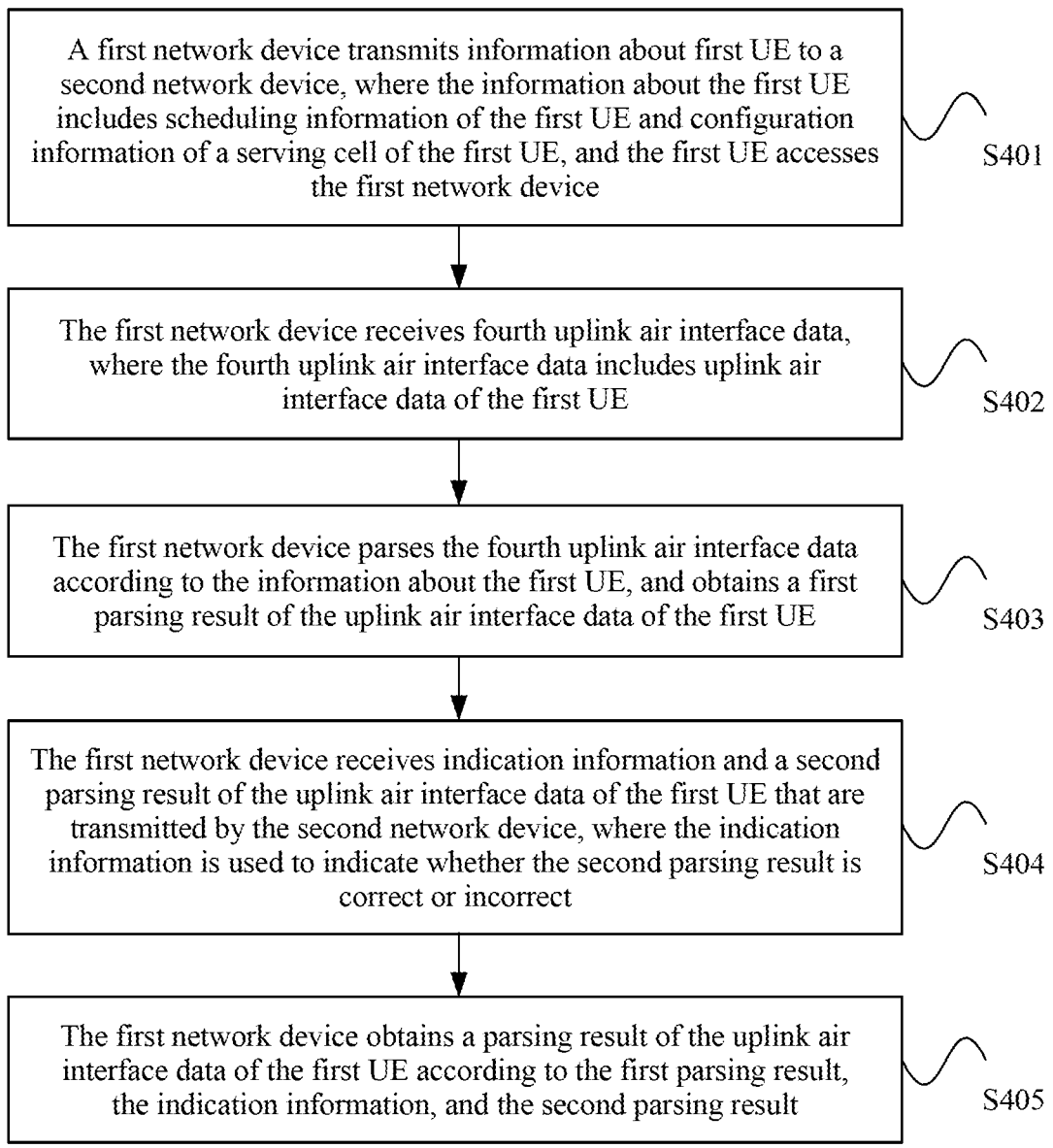
FIG. 15 is a flowchart of Embodiment 4 of an uplink interference processing method according to the present invention.

FIG. 15 is a flowchart of Embodiment 4 of an uplink interference processing method according to the present invention. As shown in FIG. 15, the method in this embodiment may include the following steps.

S401. A first network device transmits information about first UE to a second network device, where the information about the first UE includes scheduling information of the first UE and configuration information of a serving cell of the first UE, and the first UE accesses the first network device.

In this embodiment, correspondingly, the second network device receives the information about the first UE that is transmitted by the first network device.

The first network device may use a neighboring cell management frame to carry the information about the first UE and transmit the neighboring cell management frame to the second network device, and a delay 1 of interaction between the first network device and the second network device exists herein. The second network device receives and parses the neighboring cell management frame, and obtains the information about the first UE from the neighboring cell management frame.

S402. The first network device receives fourth uplink air interface data, where the fourth uplink air interface data includes uplink air interface data of the first UE.

In this embodiment, the first network device may receive the fourth uplink air interface data. The fourth uplink air interface data includes uplink air interface data of the first UE. Optionally, the fourth uplink air interface data may further include uplink air interface data of another UE, such as uplink air interface data of second UE.

S403. The first network device parses the fourth uplink air interface data according to the information about the first UE, and obtains a first parsing result of the uplink air interface data of the first UE.

In this embodiment, the first network device may parse the fourth uplink air interface data according to the information about the first UE, and may obtain a parsing result of the uplink air interface data of the first UE. The parsing result that is of the uplink air interface data of the first UE and obtained by the first network device by parsing is called a first parsing result.

S404. The first network device receives indication information and a second parsing result of the uplink air interface data of the first UE that are transmitted by the second network device, where the indication information is used to indicate whether the second parsing result is correct or incorrect.

In this embodiment, after receiving the information about the first UE that is transmitted by the first network device, the second network device obtains a parsing result of the uplink air interface data of the first UE according to the information about the first UE and uplink air interface data (which may be called fifth uplink air interface data) received by the second network device, and transmits the parsing result to the first network device. The parsing result that is transmitted by the first network device to the second network device is called a second parsing result. In addition, the second network device transmits indication information to the first network device, where the indication information is used to indicate that the second parsing result is correct, or the indication information is used to indicate that the second parsing result is incorrect. Because the parsing result that is of the uplink air interface data of the first UE and transmitted by the second network device rather than the uplink air interface data transmitted by the second network device is received by the first network device, an amount of transmitted data is reduced, and bandwidth requirements between network devices are lowered.

S405. The first network device obtains a parsing result of the uplink air interface data of the first UE according to the first parsing result, the indication information, and the second parsing result.

In this embodiment, the first network device obtains a final parsing result of the uplink air interface data of the first UE according to the first parsing result that is of the uplink air interface data of the first UE and obtained by parsing, the received second parsing result of the uplink air interface data of the first UE, and the received indication information. That is, joint receiving of the uplink air interface data of the first UE is implemented. A correct rate of the obtained parsing result of the uplink air interface data of the first UE is increased, and uplink transmission performance of the first UE is improved.

According to the downlink interference processing method provided in this embodiment of the present invention, the first network device transmits the information about the first UE to the second network device; parses the received fourth uplink air interface data according to the information about the first UE to obtain the first parsing result of the uplink air interface data of the first UE; receives the indication information and the second parsing result of the uplink air interface data of the first UE that are transmitted by the second network device; and then obtains the parsing result of the uplink air interface data of the first UE according to the first parsing result, the indication information, and the second parsing result. This can improve a correct rate of the parsing result of the uplink air interface data of the first UE and improve uplink transmission performance of the first UE. In addition, an amount of data that is of the second parsing result of the uplink air interface data of the first UE and exchanged between the first network device and the second network device is relatively small, thereby lowering bandwidth and delay requirements. When there is a constraint of bandwidth and a delay of an interaction channel between network devices, uplink transmission performance of the first UE can be improved.

Figure 16:
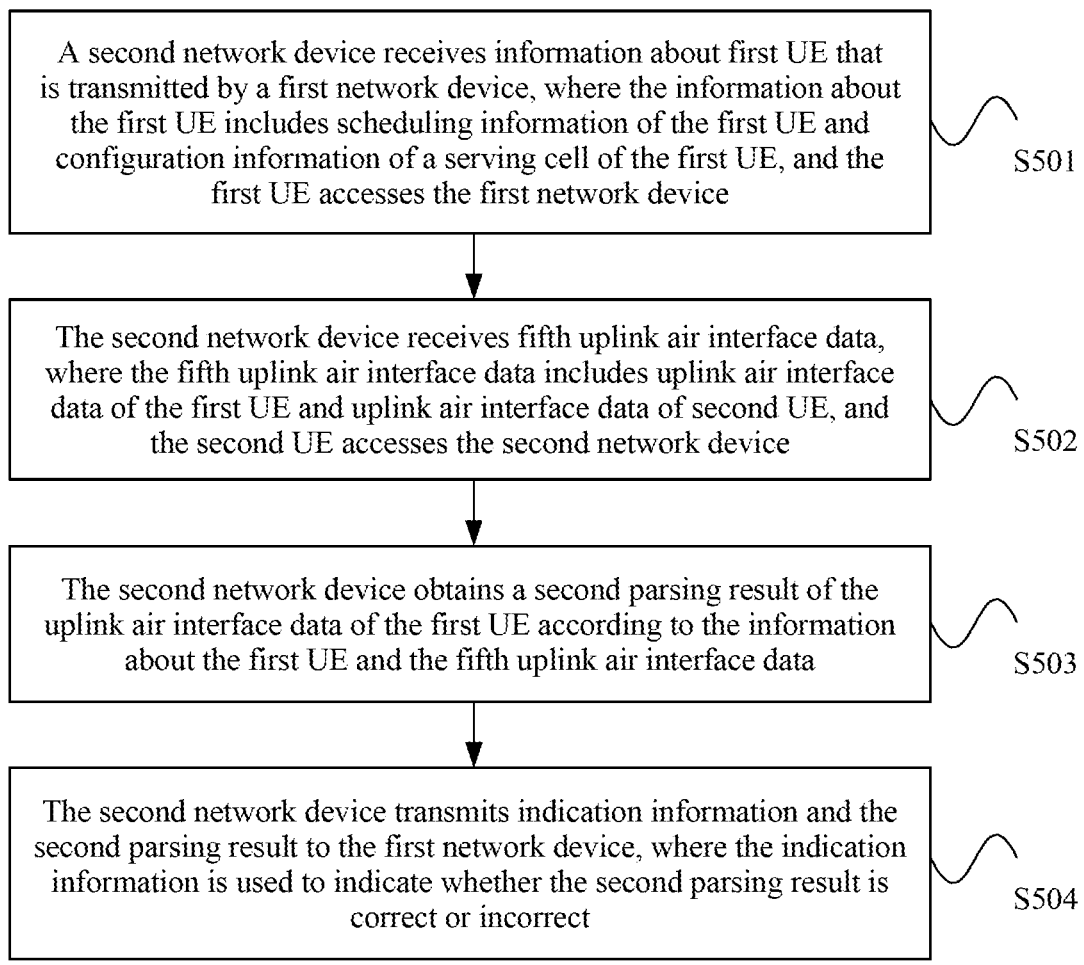
FIG. 16 is a flowchart of Embodiment 5 of an uplink interference processing method according to the present invention.

FIG. 16 is a flowchart of Embodiment 5 of an uplink interference processing method according to the present invention. As shown in FIG. 16, the method in this embodiment may include the following steps.

S501. A second network device receives information about first UE that is transmitted by a first network device, where the information about the first UE includes scheduling information of the first UE and configuration information of a serving cell of the first UE, and the first UE accesses the first network device.

In this embodiment, the second network device may receive a neighboring cell management frame that carries the information about the first UE and transmitted by the first network device, and a delay 1 of interaction between the first network device and the second network device exists herein. The second network device receives and parses the neighboring cell management frame, and obtains the information about the first UE from the neighboring cell management frame.

S502. The second network device receives fifth uplink air interface data, where the fifth uplink air interface data includes uplink air interface data of the first UE and uplink air interface data of second UE, and the second UE accesses the second network device.

In this embodiment, the second network device may receive the fifth uplink air interface data. The fifth uplink air interface data includes the uplink air interface data of the first UE and the uplink air interface data of the second UE. Optionally, the fifth uplink air interface data may further include uplink air interface data of another UE.

It should be noted that an execution sequence between S501 and S502 is not limited.

S503. The second network device obtains a second parsing result of the uplink air interface data of the first UE according to the information about the first UE and the fifth uplink air interface data.

In this embodiment, the second network device obtains a parsing result of the uplink air interface data of the first UE according to the information about the first UE and the received fifth uplink air interface data. The parsing result herein is called a second parsing result.

S504. The second network device transmits indication information and the second parsing result to the first network device, where the indication information is used to indicate whether the second parsing result is correct or incorrect.

In this embodiment, when the second parsing result is correct, the indication information is used to indicate that the second parsing result is correct; or, when the second parsing result is incorrect, the indication information is used to indicate that the second parsing result is incorrect. Because the parsing result of the uplink air interface data of the first UE rather than the uplink air interface data is transmitted by the second network device to the first network device, an amount of transmitted data is reduced, and bandwidth requirements between network devices are lowered.

According to the uplink interference processing method provided in this embodiment of the present invention, the second network device receives the information about the first UE that is transmitted by the first network device; obtains the second parsing result of the uplink air interface data of the first UE according to the information about the first UE and the received fifth uplink air interface data; and then transmits the indication information and the second parsing result to the first network device, where the indication information is used to indicate whether the second parsing result is correct or incorrect. Therefore, the first network device obtains a parsing result of the uplink air interface data of the first UE according to the first parsing result, the indication information, and the second parsing result that is of the uplink air interface data of the first UE and obtained by the second network device by parsing, thereby improving a correct rate of the parsing result of the uplink air interface data of the first UE and improving uplink transmission performance of the first UE. In addition, an amount of data that is of the second parsing result of the uplink air interface data of the first UE and exchanged between the first network device and the second network device is relatively small, thereby lowering bandwidth and delay requirements. When there is a constraint of bandwidth and a delay of an interaction channel between network devices, uplink transmission performance of the first UE can be improved.

Figure 17:
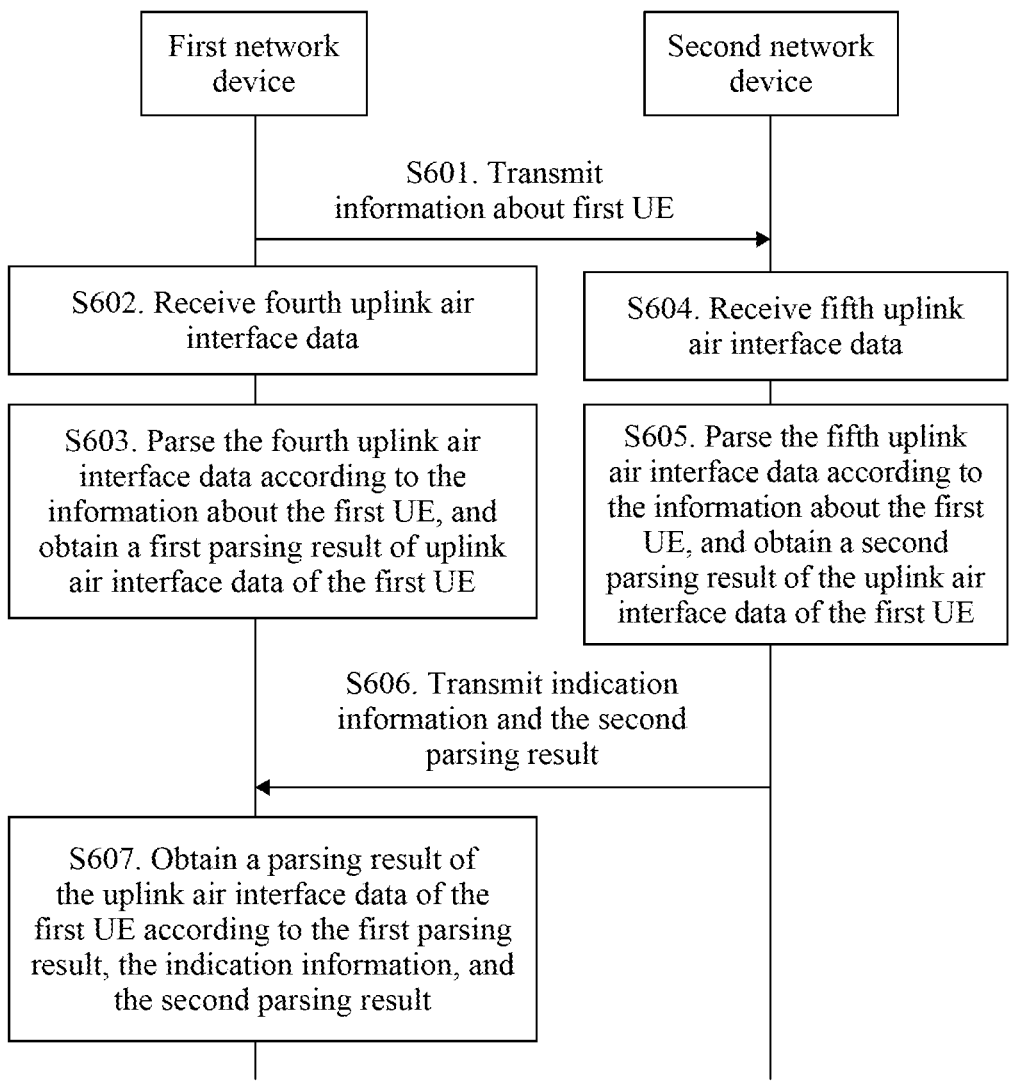
FIG. 17 is a flowchart of Embodiment 6 of an uplink interference processing method according to the present invention.

FIG. 17 is a flowchart of Embodiment 6 of an uplink interference processing method according to the present invention. As shown in FIG. 17, the method in this embodiment may include the following steps.

S601. A first network device transmits information about first UE to a second network device.

S602. The first network device receives fourth uplink air interface data.

S603. The first network device parses the fourth uplink air interface data according to the information about the first UE, and obtains a first parsing result of uplink air interface data of the first UE.

For a specific implementation process of S601-S603 in this embodiment, reference may be made to the specific implementation process of S401-S403 in method Embodiment 4 of the present invention, and no repeated description is given herein any further.

S604. The second network device receives fifth uplink air interface data.

S605. The second network device parses the fifth uplink air interface data according to the information about the first UE, and obtains a second parsing result of the uplink air interface data of the first UE.

S606. The second network device transmits indication information and the second parsing result to the first network device.

The indication information is used to indicate whether the second parsing result is correct or incorrect.

For a specific implementation process of S604-S606 in this embodiment, reference may be made to the specific implementation process of S502-S504 in method Embodiment 5 of the present invention, and no repeated description is given herein any further.

S607. The first network device obtains a parsing result of the uplink air interface data of the first UE according to the first parsing result, the indication information, and the second parsing result.

In a first feasible implementation manner, when the first parsing result is correct, the obtaining, by the first network device, a parsing result of the uplink air interface data of the first UE according to the first parsing result, the indication information, and the second parsing result includes: using, by the first network device, the first parsing result as the parsing result of the uplink air interface data of the first UE. Then the first network device may report the first parsing result to a media access control (MAC for short) layer and perform subsequent scheduling.

In a second feasible implementation manner, when the first parsing result is incorrect and the indication information indicates that the second parsing result is correct, the obtaining, by the first network device, a parsing result of the uplink air interface data of the first UE according to the first parsing result, the indication information, and the second parsing result includes: using, by the first network device, the second parsing result as the parsing result of the uplink air interface data of the first UE. Then the first network device may report the second parsing result to a MAC layer and perform subsequent scheduling.

In a third feasible implementation manner, when the first parsing result is incorrect and the indication information indicates that the second parsing result is incorrect, the obtaining, by the first network device, a parsing result of the uplink air interface data of the first UE according to the first parsing result, the indication information, and the second parsing result includes: combining, by the first network device, the first parsing result and the second parsing result to obtain the parsing result of the uplink air interface data of the first UE. Then the first network device may report the parsing result of the uplink air interface data of the first UE to a MAC layer and perform subsequent scheduling, where the parsing result is obtained by combining.

Optionally, after the combining, by the first network device, the first parsing result and the second parsing result to obtain the parsing result of the uplink air interface data of the first UE, the method further includes: transmitting, by the first network device, retransmission information to the first UE by using a PDCCH when the parsing result of the uplink air interface data of the first UE is incorrect. When the parsing result that is of the uplink air interface data of the first UE and obtained by combining the first parsing result and the second parsing result is incorrect, the first network device may further transmit retransmission information to the first UE, so that after receiving the retransmission information, the first UE retransmits uplink air interface data of the first UE.

Optionally, when a time interval is greater than a preset time period, the first network device stops processing a current HARQ process and transmits an acknowledgement ACK message to the first UE, where the time interval is from a start of receiving the fourth uplink air interface data by the first network device to a start of receiving the indication information and the second parsing result. The obtaining, by the first network device, a parsing result of the uplink air interface data of the first UE according to the first parsing result, the indication information, and the second parsing result includes: obtaining, by the first network device, the parsing result of the uplink air interface data of the first UE according to the first parsing result, the indication information, and the second parsing result when a time point of processing a next HARQ process of the current HARQ process arrives.

The second network device transmits the indication information and the first parsing result to the first network device, and a delay 2 of interaction between the first network device and the second network device exists herein. The embodiment of the present invention further provides a solution applied when the delay is relatively long. Before the first network device performs the third feasible implementation manner of S607, the first network device may determine whether a time interval is greater than a preset time period, where the time interval is from a start of receiving the fourth uplink air interface data by the first network device to a start of receiving the indication information and the second parsing result. When the time interval is not greater than the preset time period, the first network device performs the third feasible implementation manner of S607 directly, where the time interval is from the start of receiving the fourth uplink air interface data by the first network device to the start of receiving the indication information and the second parsing result. When the time interval is not greater than the preset time period, the first network device stops processing a current HARQ process and transmits an acknowledgement (ACK for short) message to the first UE, where the time interval is from the start of receiving the fourth uplink air interface data by the first network device to the start of receiving the indication information and the second parsing result; and the first network device performs the third feasible implementation manner of S607 when a time point of processing a next HARQ process of the current HARQ process arrives. In this way, the following technical problem in the prior art is resolved: When a delay of receiving, by the first network device, uplink air interface data of the first UE transmitted by the second network device is extremely long, a parsing result of the uplink air interface data of the first UE cannot be obtained according to uplink air interface data received by the first network device and the uplink air interface data transmitted by the second network device, and uplink transmission performance of the first UE cannot be enhanced.

The uplink interference processing method provided in Embodiment 6 of the present invention can improve a correct rate of the parsing result that is of the uplink air interface data of the first UE and obtained by the first network device, and improve uplink transmission performance of the first UE. In addition, an amount of data that is of the second parsing result of the uplink air interface data of the first UE and exchanged between the first network device and the second network device is relatively small, thereby lowering bandwidth and delay requirements. When there is a constraint of bandwidth and a delay of an interaction channel between network devices, uplink transmission performance of the first UE can be improved.

Figure 18:
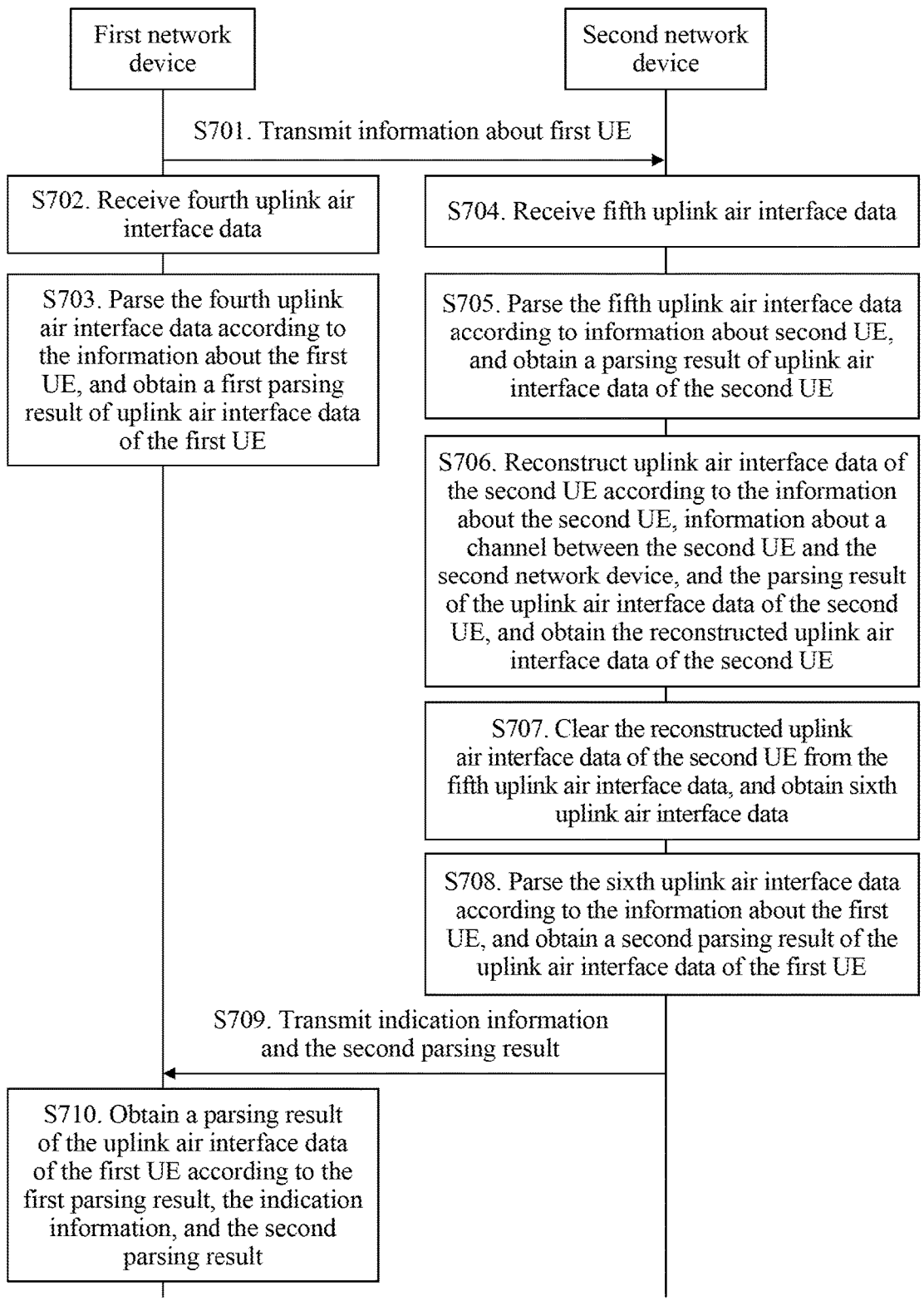
FIG. 18 is a flowchart of Embodiment 7 of an uplink interference processing method according to the present invention.

FIG. 18 is a flowchart of Embodiment 7 of an uplink interference processing method according to the present invention. As shown in FIG. 18, the method in this embodiment may include the following steps.

S701. A first network device transmits information about first UE to a second network device.

S702. The first network device receives fourth uplink air interface data.

S703. The first network device parses the fourth uplink air interface data according to the information about the first UE, and obtains a first parsing result of uplink air interface data of the first UE.

S704. The second network device receives fifth uplink air interface data.

A specific implementation process of S701-S704 in this embodiment is similar to the specific implementation process of S601-S604 in method Embodiment 6 of the present invention, and no repeated description is given herein any further.

S705. The second network device parses the fifth uplink air interface data according to information about second UE, and obtains a parsing result of uplink air interface data of the second UE.

In this embodiment, the information about the second UE is configured by the second network device, and the information about the second UE includes scheduling information of the second UE and configuration information of a serving cell of the second UE.

S706. The second network device reconstructs uplink air interface data of the second UE according to the information about the second UE, information about a channel between the second UE and the second network device, and the parsing result of the uplink air interface data of the second UE, and obtains the reconstructed uplink air interface data of the second UE.

S707. The second network device clears the reconstructed uplink air interface data of the second UE from the fifth uplink air interface data, and obtains sixth uplink air interface data.

S708. The second network device parses the sixth uplink air interface data according to the information about the first UE, and obtains a second parsing result of the uplink air interface data of the first UE.

A specific implementation process of S705-S708 in this embodiment is similar to the specific implementation process of S204-S207 in method Embodiment 2 of the present invention, and no repeated description is given herein any further.

A correct rate of the second parsing result that is of the uplink air interface data of the first UE and obtained by using S705-S708 in this embodiment is enhanced.

S709. The second network device transmits indication information and the second parsing result to the first network device.

The indication information is used to indicate whether the second parsing result is correct or incorrect.

S710. The first network device obtains a parsing result of the uplink air interface data of the first UE according to the first parsing result, the indication information, and the second parsing result.

A specific implementation process of S709 and S710 in this embodiment is similar to the specific implementation process of S606 and S607 in method Embodiment 6 of the present invention, and no repeated description is given herein any further.

The uplink interference processing method provided in this embodiment of the present invention can improve a correct rate of the parsing result that is of the uplink air interface data of the first UE and obtained by the first network device, and improve uplink transmission performance of the first UE. In addition, an amount of data that is of the second parsing result of the uplink air interface data of the first UE and exchanged between the first network device and the second network device is relatively small, thereby lowering bandwidth and delay requirements. When there is a constraint of bandwidth and a delay of an interaction channel between network devices, uplink transmission performance of the first UE can be improved.

Optionally, on a basis of method Embodiment 7 of the present invention, before performing S705-S708, the second network device may further parse the fourth uplink air interface data according to the information about the first UE, and obtains a parsing result of the uplink air interface data of the first UE. When the parsing result is incorrect, the second network device performs S705-S708. When the parsing result is correct, the second network device transmits indication information and the parsing result (that is, the second parsing result) to the first network device. The indication information is used to indicate that the second parsing result is correct.

Figure 19:
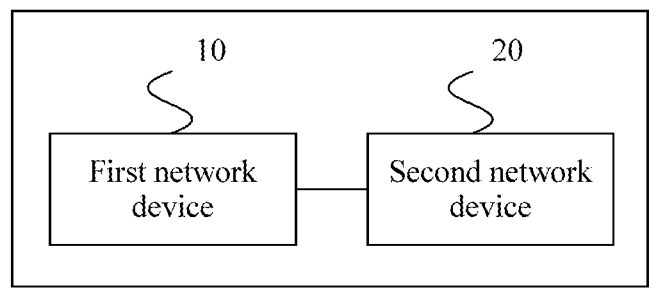
FIG. 19 is a schematic structural diagram of an embodiment of an uplink interference processing system according to the present invention.

FIG. 19 is a schematic structural diagram of an embodiment of an uplink interference processing system according to the present invention. As shown in FIG. 19, the system in this embodiment may include a first network device 10 and a second network device 20. The first network device 10 is communicationally connected to the second network device 20.

In a feasible implementation manner, the first network device 10 may have a structure in any network device embodiment in FIG. 1 to FIG. 3, and correspondingly may execute the technical solutions executed by a first network device in any one of the foregoing method Embodiments 1 to 3 of the present invention. Implementation principles and technical effects thereof are similar, and details are not described herein any further. The second network device 20 may have a structure in a network device embodiment shown in FIG. 4 or FIG. 5, and correspondingly may execute the technical solutions executed by a second network device in the foregoing method Embodiments 2 or 3 of the present invention. Implementation principles and technical effects thereof are similar, and details are not described herein any further.

In another feasible implementation manner, the first network device 10 may have a structure in a network device embodiment shown in FIG. 6 or FIG. 7, and correspondingly may execute the technical solutions executed by a first network device in any one of the foregoing method Embodiments 4 to 7 of the present invention. Implementation principles and technical effects thereof are similar, and details are not described herein any further. The second network device 20 may have a structure in a network device embodiment shown in FIG. 8 or FIG. 9, and correspondingly may execute the technical solutions executed by a second network device in the foregoing method Embodiments 5 or 7 of the present invention. Implementation principles and technical effects thereof are similar, and details are not described herein any further.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a read-only memory (ROM for short), a random access memory (RAM for short), a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention

What is claimed is:

1. A first network device, comprising:
a non-transitory computer-readable storage medium comprising instructions; and
one or more processors in communication with the non-transitory computer-readable storage medium, wherein the one or more processors execute the instructions to:
receive information about a second user equipment (UE) transmitted by a second network device, the information about the second UE comprising scheduling information of the second UE and configuration information of a serving cell of the second UE, the second UE accessing the second network device;
receive first uplink air interface data, the first uplink air interface data comprising uplink air interface data of a first UE and uplink air interface data of the second UE, the first UE accessing the first network device;
based on the uplink air interface data of the first UE being parsed unsuccessfully, reconstruct uplink air interface data of the second UE according to the information about the second UE that is received, and obtain reconstructed uplink air interface data of the second UE;
clear, from the first uplink air interface data, the reconstructed uplink air interface data of the second UE, and obtain second uplink air interface data;
parse, according to information about the first UE, the second uplink air interface data, and obtain a parsing result of the uplink air interface data of the first UE, the information about the first UE comprising scheduling information of the first UE and configuration information of a serving cell of the first UE; and
transmit retransmission information to the first UE using a physical downlink control channel (PDCCH) based on the parsing result of the uplink air interface data of the first UE indicating that the uplink air interface data of the first UE was parsed incorrectly.

2. The first network device according to claim 1, wherein the one or more processors execute further instructions to:
reconstruct the uplink air interface data of the second UE according to the information about the second UE, information about a channel from the second UE to the first network device, and a parsing result of the uplink air interface data of the second UE.

3. The first network device according to claim 2, wherein the one or more processors execute further instructions to:
before the uplink air interface data of the second UE is reconstructed according to the information about the second UE, and the reconstructed uplink air interface data of the second UE is obtained, parse the first uplink air interface data according to the information about the second UE, and obtain the parsing result of the uplink air interface data of the second UE.

4. The first network device according to claim 2, wherein the one or more processors execute further instructions to:
before the uplink air interface data of the second UE is reconstructed according to the information about the second UE, and the reconstructed uplink air interface data of the second UE is obtained, receive the parsing result that is of the uplink air interface data of the second UE and transmitted by the second network device.

5. The first network device according to claim 4, wherein the one or more processors execute further instructions to:
stop processing a current hybrid automatic repeat request (HARQ) process based on a time interval being greater than a preset time period, wherein the time interval is from a start of receiving the first uplink air interface data to a start of receiving the parsing result of the uplink air interface data of the second UE;
transmit an acknowledgement (ACK) message to the first UE; and
reconstruct the uplink air interface data of the second UE according to the information about the second UE based on a time point of processing a next HARQ process of the current HARQ process arriving, and obtain the reconstructed uplink air interface data of the second UE.

6. A method, comprising:
receiving, by a first network device, information about a second user equipment (UE) that is transmitted by a second network device, wherein the information about the second UE comprises scheduling information of the second UE and configuration information of a serving cell of the second UE, and the second UE accesses the second network device;
receiving, by the first network device, first uplink air interface data, wherein the first uplink air interface data comprises uplink air interface data of a first UE and uplink air interface data of the second UE, and the first UE accesses the first network device;
based on the uplink air interface data of the first UE being parsed unsuccessfully, reconstructing, by the first network device, uplink air interface data of the second UE according to the information about the second UE, and obtaining reconstructed uplink air interface data of the second UE;

clearing, by the first network device, the reconstructed uplink air interface data of the second UE from the first uplink air interface data, and obtaining second uplink air interface data;

parsing, by the first network device, the second uplink air interface data according to information about the first UE, and obtaining a parsing result of the uplink air interface data of the first UE, wherein the information about the first UE comprises scheduling information of the first UE and configuration information of a serving cell of the first UE; and transmitting, by the first network device, retransmission information to the first UE by using a physical downlink control channel (PDCCH) based on the parsing result of the uplink air interface data of the first UE indicating that the uplink air interface data of the first UE was parsed incorrectly.

7. The method according to claim 6, wherein reconstructing, by the first network device, the uplink air interface data of the second UE according to the information about the second UE, and obtaining the reconstructed uplink air interface data of the second UE comprises:

reconstructing, by the first network device, the uplink air interface data of the second UE according to the information about the second UE, information about a channel from the second UE to the first network device, and a parsing result of the uplink air interface data of the second UE, and obtaining the reconstructed uplink air interface data of the second UE.

8. The method according to claim 7, wherein before reconstructing, by the first network device, the uplink air interface data of the second UE according to the information about the second UE, and obtaining the reconstructed uplink air interface data of the second UE, the method further comprises:

parsing, by the first network device, the first uplink air interface data according to the information about the second UE, and obtaining a parsing result of the uplink air interface data of the second UE.

9. The method according to claim 7, wherein before reconstructing, by the first network device, the uplink air interface data of the second UE according to the information about the second UE, and obtaining the reconstructed uplink air interface data of the second UE, the method further comprises:

receiving, by the first network device, a parsing result that is of the uplink air interface data of the second UE and transmitted by the second network device.

10. The method according to claim 9, further comprising:

stopping, by the first network device, processing a current hybrid automatic repeat request (HARQ) process based on a time interval being greater than a preset time period, and transmitting an acknowledgment (ACK) message to the first UE, wherein the time interval is from a start of receiving the first uplink air interface data by the first network device to a start of receiving the parsing result of the uplink air interface data of the second UE; and wherein reconstructing, by the first network device, the uplink air interface data of the second UE according to the information about the second UE, and obtaining the reconstructed uplink air interface data of the second UE comprises:

reconstructing, by the first network device, the uplink air interface data of the second UE according to the information about the second UE based on a time point of processing a next HARQ process of the current HARQ process arriving, and obtaining the reconstructed uplink air interface data of the second UE.

11. A non-transitory computer-readable media storing computer instructions that, when executed by one or more processors of a first network device, cause the one or more processors to perform operations comprising:

receiving information about a second user equipment (UE) transmitted by a second network device, wherein the information about the second UE comprises scheduling information of the second UE and configuration information of a serving cell of the second UE, and the second UE accesses the second network device;

receiving first uplink air interface data, wherein the first uplink air interface data comprises uplink air interface data of a first UE and uplink air interface data of the second UE, and the first UE accesses the first network device;

based on the uplink air interface data of the first UE being parsed unsuccessfully, reconstructing uplink air interface data of the second UE according to the information about the second UE that is received, and obtaining reconstructed uplink air interface data of the second UE;

clearing, from the first uplink air interface data, the reconstructed uplink air interface data of the second UE, and obtaining second uplink air interface data;

parsing, according to information about the first UE, the second uplink air interface data, and obtaining a parsing result of the uplink air interface data of the first UE, wherein the information about the first UE comprises scheduling information of the first UE and configuration information of a serving cell of the first UE; and transmitting retransmission information to the first UE using a physical downlink control channel (PDCCH) based on the parsing result of the uplink air interface data of the first UE indicating that the uplink air interface data of the first UE was parsed incorrectly.

12. The non-transitory computer-readable media of claim 11, wherein the operations further comprise:

reconstructing the uplink air interface data of the second UE according to the information about the second UE, information about a channel from the second UE to the first network device, and a parsing result of the uplink air interface data of the second UE.

13. The non-transitory computer-readable media of claim 12, wherein the operations further comprise:

before reconstructing the uplink air interface data of the second UE and obtaining the reconstructed uplink air interface data of the second UE, parsing the first uplink air interface data according to the information about the second UE, and obtaining the parsing result of the uplink air interface data of the second UE.

14. The non-transitory computer-readable media of claim 12, wherein the operations further comprise:

before reconstructing the uplink air interface data of the second UE and obtaining the reconstructed uplink air interface data of the second UE, receiving, from the second network device, the parsing result that is of the uplink air interface data of the second UE.

15. The non-transitory computer-readable media of claim 14, wherein the operations further comprise:

stopping processing a current hybrid automatic repeat request (HARQ) process based on a time interval being greater than a preset time period, wherein the time interval is from a start of receiving the first uplink air interface data to a start of receiving the parsing result of the uplink air interface data of the second UE;

transmitting an acknowledgement (ACK) message to the first UE; and reconstructing the uplink air interface data of the second UE according to the information about the second UE based on a time point of processing a next HARQ process of the current HARQ process arriving, and obtaining the reconstructed uplink air interface data of the second UE.

* * * * *